US010713052B2

(12) United States Patent
Sankaranarayanan et al.

(10) Patent No.: US 10,713,052 B2
(45) Date of Patent: Jul. 14, 2020

(54) PREFETCHER FOR DELINQUENT IRREGULAR LOADS

(71) Applicant: Intel Corporation, Santa Clara, CA (US)

(72) Inventors: Karthik Sankaranarayanan, Hillsboro, OR (US); Stephen J. Tarsa, Cambridge, MA (US); Gautham N. Chinya, Hillsboro, OR (US); Helia Naeimi, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/021,974

(22) Filed: Jun. 28, 2018

(65) Prior Publication Data

US 2020/0004541 A1 Jan. 2, 2020

(51) Int. Cl.
*G06F 9/38* (2018.01)
*G06F 9/30* (2018.01)

(52) U.S. Cl.
CPC .......... *G06F 9/3802* (2013.01); *G06F 9/3017* (2013.01); *G06F 9/3818* (2013.01)

(58) Field of Classification Search
None
See application file for complete search history.

(56) References Cited

U.S. PATENT DOCUMENTS

| 7,577,947 | B2* | 8/2009 | Subramoney | G06F 12/0253 711/213 |
| 9,430,240 | B1* | 8/2016 | Atta | G06F 9/3851 |
| 9,836,292 | B2* | 12/2017 | Agesen | G06F 9/3017 |
| 2005/0027941 | A1* | 2/2005 | Wang | G06F 9/383 711/121 |
| 2005/0071438 | A1 | 3/2005 | Liao et al. | |
| 2007/0088915 | A1* | 4/2007 | Archambault | G06F 8/4442 711/137 |
| 2007/0150660 | A1* | 6/2007 | Marathe | G06F 12/0862 711/137 |
| 2014/0013089 | A1* | 1/2014 | Henry | G06F 9/30076 712/226 |
| 2017/0115988 | A1* | 4/2017 | Jung | G06F 12/0862 |

(Continued)

OTHER PUBLICATIONS

European Search Report and Search Opinion, EP App. No. 19175813.5, dated Nov. 13, 2019, 11 pages.

(Continued)

*Primary Examiner* — Michael Sun
(74) *Attorney, Agent, or Firm* — Nicholson De Vos Webster & Elliot LLP

(57) ABSTRACT

Disclosed embodiments relate to a prefetcher for delinquent irregular loads. In one example, a processor includes a cache memory, fetch and decode circuitry to fetch and decode instructions from a memory; and execution circuitry including a binary translator (BT) to respond to the decoded instructions by storing a plurality of decoded instructions in a BT cache, identifying a delinquent irregular load (DIRRL) among the plurality of decoded instructions, determining whether the DIRRL is prefetchable, and, if so, generating a custom prefetcher to cause the processor to prefetch a region of instructions leading up to the prefetchable DIRRL.

25 Claims, 28 Drawing Sheets

(56) References Cited

U.S. PATENT DOCUMENTS

2018/0232232 A1*  8/2018  Jung .................... G06F 9/3804
2019/0179766 A1*  6/2019  Venkatasubramanian ..................
                                                  G06F 9/4552

OTHER PUBLICATIONS

Hashemi et al., "Continuous Runahead: Transparent Hardware Acceleration for Memory Intensive Workloads," 49th Annual IEEE/ACM International Symposium on Microarchitecture (MICRO), Oct. 2016, pp. 1-12.

Jain et al., "Linearizing Irregular Memory Accesses for Improved Correlated Prefetching", MICRO-46, Proceedings of the 46th Annual IEEE/ACM International Symposium on Microarchitecture, Dec. 7-11, 2013, 13 pages.

Johnson, Donald B., "Finding all the elementary circuits of a directed graph", SIAM Journal on Computing, vol. 4, No. 1, Mar. 1975, pp. 77-84.

Joseph et al., "Prefetching using Markov Predictors,"ISCA'97, Proceedings of the 24th Annual International Symposium on Computer Architecture, May 1997, pp. 252-263.

Khan et al., "Resource conscious prefetching for irregular applications in multicores", 2014 International Conference on Embedded Computer Systems: Architectures, Modeling, and Simulation (SAMOS XIV), IEEE, Jul. 14-17, 2014, pp. 34-43.

Kim et al., "Physical Experimentation with Prefetching Helper Threads on Intels Hyper-Threaded Processors", International Symposium on Code Generation and Optimization, CGO, Mar. 2004, 12 pages.

Lee et al., "When Prefetching Works, When it Doesn't, and Why", ACM Transactions on Architecture and Code Optimization, vol. 9, No. 1, Article 2, Mar. 2012, pp. 2:1-2:29.

Mutlu et al., "Techniques for Efficient Processing in Runahead Execution Engines", ISCA'05, Proceedings of the 32nd annual international symposium on Computer Architecture, Jun. 2005, pp. 1-12.

Peled et al., "Semantic Locality and Context-based Prefetching Using Reinforcement Learning", ISCA'15 Proceedings of the 42nd Annual International Symposium on Computer Architecture, Jun. 13-17, 2015, pp. 285-297.

Purser et al., "A Study of Slipstream Processors", MICRO 33, Proceedings of the 33rd annual ACM/IEEE international symposium on Microarchitecture, Dec. 2000, 12 pages.

Roth et al., "Effective Jump-Pointer Prefetching for Linked Data Structures", Proceedings of the 26th International Symposium on Computer Architecture, May 1999, 11 pages.

Yu et al., "IMP: Indirect Memory Prefetcher", 48th Annual IEEE/ACM International Symposium on Microarchitecture (MICRO), Dec. 5-9, 2015, 13 pages.

* cited by examiner

```
0010.   void foo () {
0020.           int n, average;
0030.           int count = 0; total= 0;
0040.           int a=0, b=0, c=0, x=0, y=0, z=0;
0050.           extern const int P, Q, R, S;
0060.
0070.           for (n=0; n < NUM_LOOPS; n++) {
0080.                   count++;
0090.                   a = P * n;
0100.                   x = P * n;
0110.                   b = a * Q;
0120.                   y = x * Q;
0130.                   c = a * R;
0140.                   c = b * S;
0150.                   z = y * R;
0160.                   total += c;
0170.                   c = (a * b) + (x * y);
0180.           }
0190.           average = total / count;
0200.   }
```

Target Instruction 402

Backslice 404

FIG. 4A

Software
Prefetch
Snippet
700

[0001] movl 0xec(% r12,% r13,8),% b0
[0002] movl 0xe8(% rl2,% r13,8),% b1
[0003] movl 0xf4{% r12,% r13,8),% b2
[0004] movl 0xf0{% r12,% r13,8),% b3
[0005] addl %ecx, % b0
[0006] addl %b2, % b0
[0007] addl %edx, %bl
[0008] addl %b3, % bl
[0009] andl $0x3FFF, %b0
[0010] andl $0x7F, %bl
[0011] movq (%rdi, % bl, 8), % b2
[0012] prefetch0 (%b0, %b2)

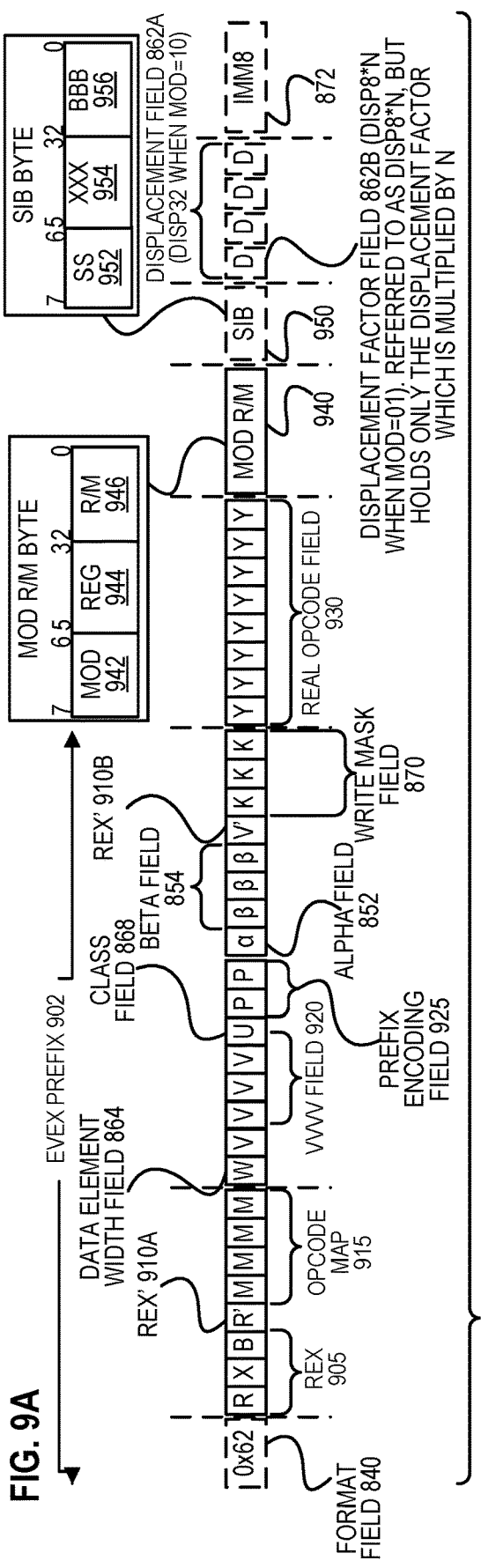
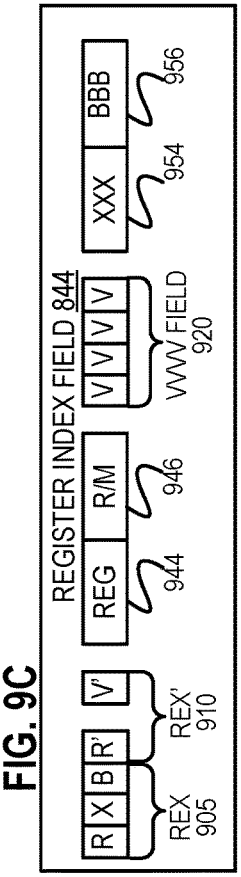
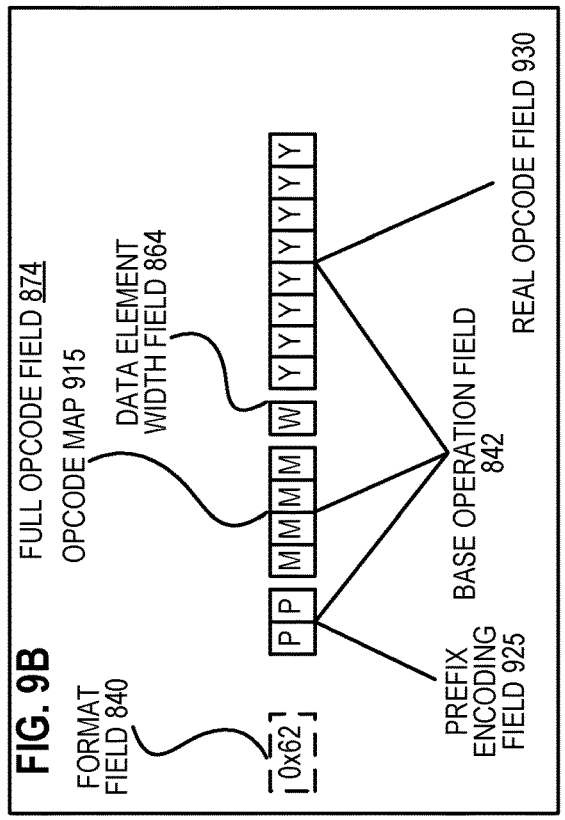
FIG. 9A
FIG. 9B
FIG. 9C

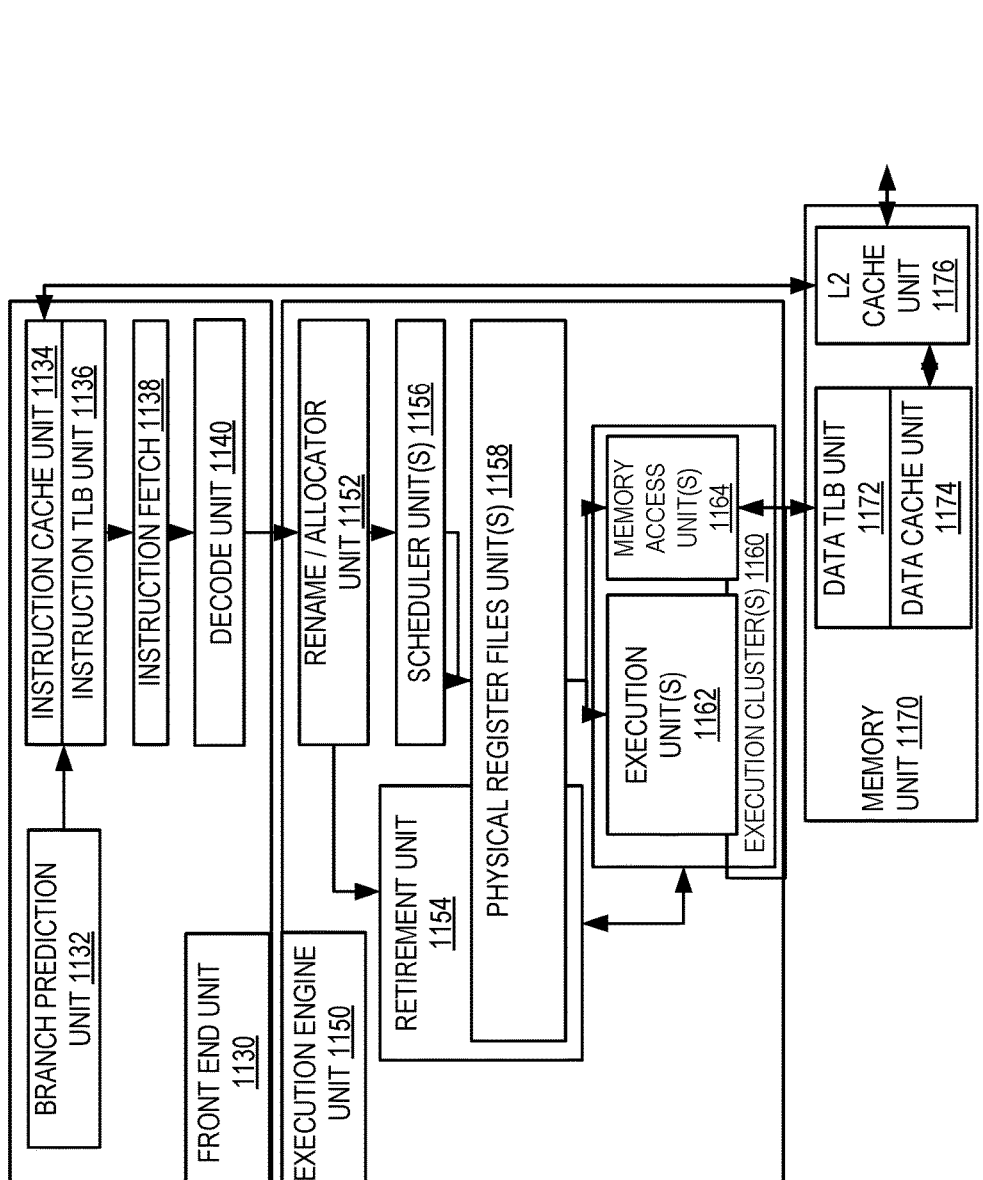
FIG. 11A
FIG. 11B

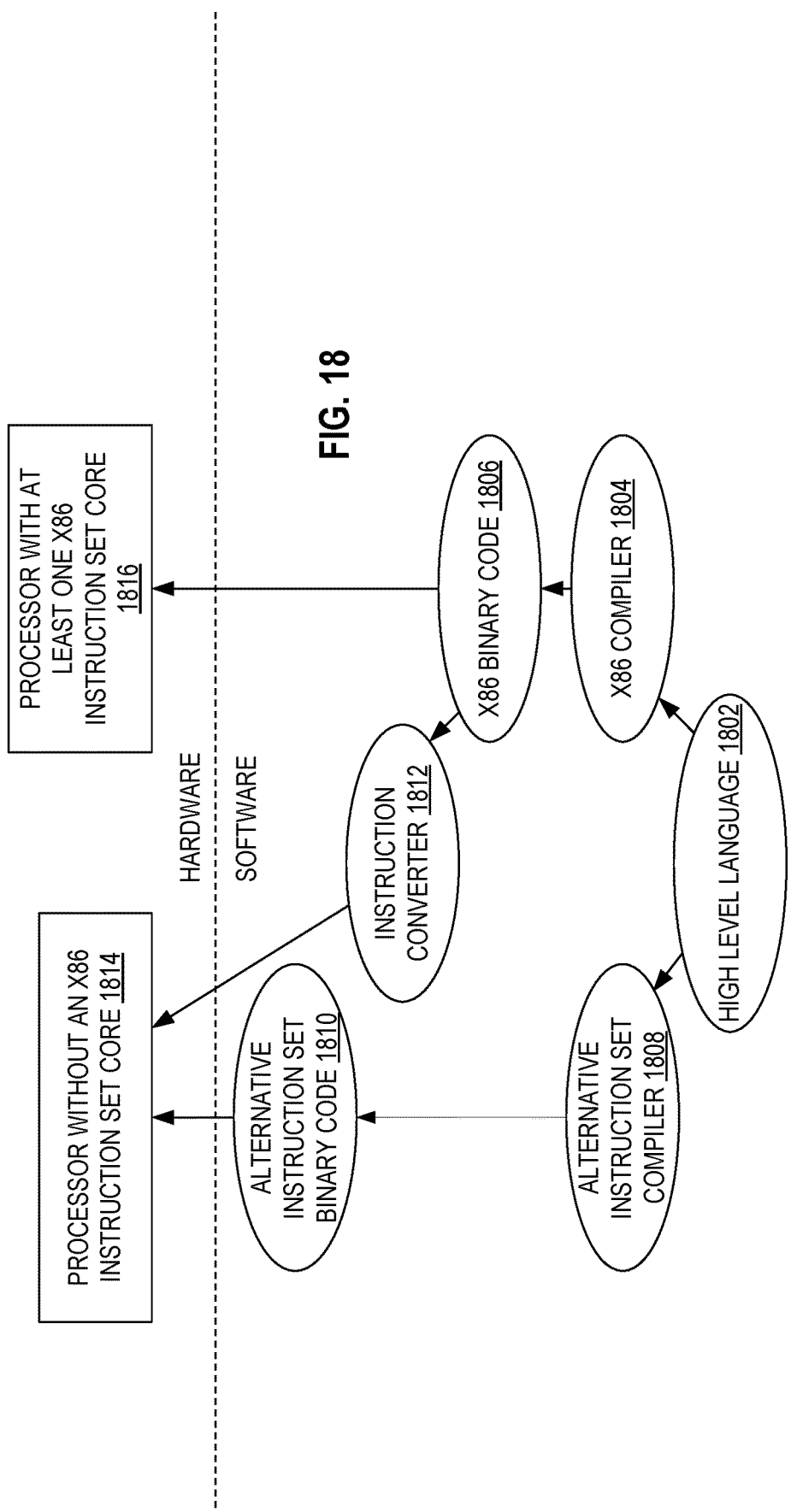

PREFETCHER FOR DELINQUENT IRREGULAR LOADS

FIELD OF THE INVENTION

The field of invention relates generally to computer processor architecture, and, more specifically, to a prefetcher for delinquent irregular loads.

BACKGROUND

As out-of-order cores become wider and deeper, microarchitectural performance tends to become more limited by two bottlenecks: cache misses and branch mispredictions. Prefetching of data can improve performance for many applications. Through a combination of hardware and software, prefetching data before the data is actually required can lead to reduced latency of memory accesses.

The impact of a cache miss can be mitigated in multiple ways, including: 1) hiding the latency of the miss through using out-of-order execution, 2) tailoring the cache replacement policy to better match applications' needs, and, 3) by prefetching the memory location before the actual demand occurs.

Load instructions can be classified into several categories, including: a) constant loads whose virtual addresses remains constant over multiple dynamic instances, b) striding loads with successive virtual addresses mainly in arithmetic progression, and, c) irregular loads that are neither constant loads nor strided loads.

Furthermore, as described herein, loads that miss in the cache frequently (i.e., greater than a threshold number of times, such as 100, 1000, 10,000, etc.) are called delinquent loads.

Prefetching delinquent irregular loads remains an open challenge.

BRIEF DESCRIPTION OF THE DRAWINGS

The present invention is illustrated by way of example and not limitation in the figures of the accompanying drawings, in which like references indicate similar elements and in which:

FIG. 4A is a code listing illustrating a backslice, according to some embodiments;

FIG. 8A is a block diagram illustrating a generic vector friendly instruction format and class A instruction templates thereof according to some embodiments of the invention;

FIG. 8B is a block diagram illustrating the generic vector friendly instruction format and class B instruction templates thereof according to some embodiments of the invention;

FIG. 9A is a block diagram illustrating an exemplary specific vector friendly instruction format according to some embodiments of the invention;

FIG. 9B is a block diagram illustrating the fields of the specific vector friendly instruction format that make up the full opcode field according to one embodiment;

FIG. 9C is a block diagram illustrating the fields of the specific vector friendly instruction format that make up the register index field according to one embodiment;

FIG. 11A is a block diagram illustrating both an exemplary in-order pipeline and an exemplary register renaming, out-of-order issue/execution pipeline according to some embodiments;

FIG. 11B is a block diagram illustrating both an exemplary embodiment of an in-order architecture core and an exemplary register renaming, out-of-order issue/execution architecture core to be included in a processor according to some embodiments;

FIG. 12A is a block diagram of a single processor core, along with its connection to the on-die interconnect network and with its local subset of the Level 2 (L2) cache, according to some embodiments;

FIG. 12B is an expanded view of part of the processor core in FIG. 12A according to some embodiments;

FIG. 14 shown a block diagram of a system in accordance with some embodiments;

FIG. 15 is a block diagram of a first more specific exemplary system in accordance with some embodiment;

FIG. 16 is a block diagram of a second more specific exemplary system in accordance with some embodiments;

FIG. 17 is a block diagram of a System-on-a-Chip (SoC) in accordance with some embodiments; and FIG. 18 is a block diagram contrasting the use of a software instruction converter to convert binary instructions in a source instruction set to binary instructions in a target instruction set according to some embodiments.

DETAILED DESCRIPTION OF THE EMBODIMENTS

Figure 1A:
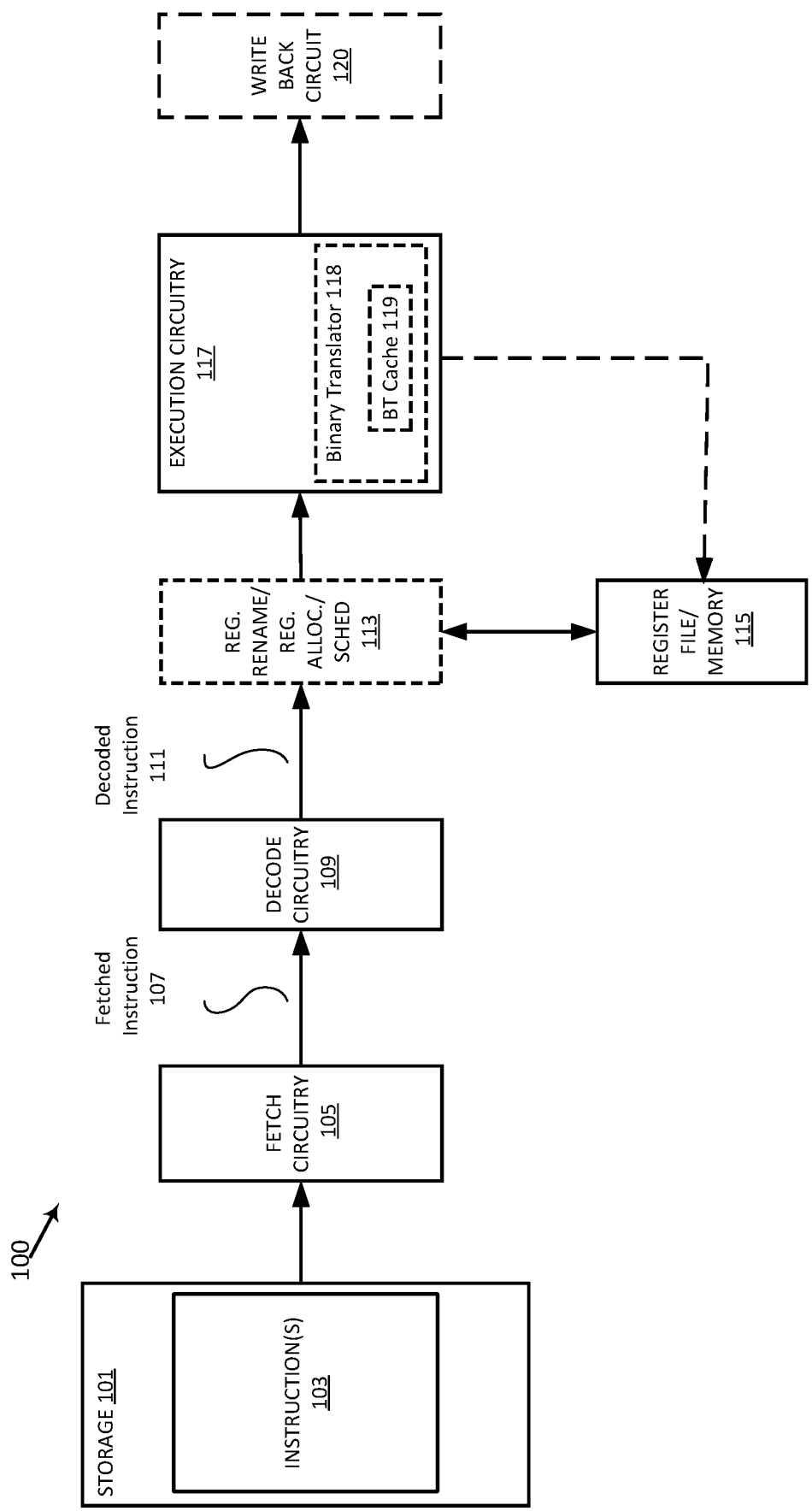
FIG. 1A is a block diagram illustrating processing components for executing instructions, according to some embodiments.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments describe an improved system and method for generating application-specific custom prefetchers designed specifically for each delinquent, irregular load (DIRRL)—sometimes referred to as a hard-to-prefetch (HTP) or (HTP) load—using profiling and analysis performed, for example, by a runtime Binary Translator (BT). According to some embodiments, the BT analyzes the cycles in a backward slice of instructions (a.k.a. "backslice") of the DIRRL to determine whether the DIRRL is prefetchable. If so, the BT either generates specific code containing prefetch hint instructions or configures a custom hardware prefetcher to prefetch one or more loads in a code region containing the DIRRL.

Unlike some failed approaches, disclosed embodiments avoid relying on large amounts of on-chip storage to record address patterns and to try to predict future addresses. Besides the exorbitant amounts of on-chip memory required, the difficulty in implementing such an approach in real hardware can be seen from its absence in commercially shipping processors.

Disclosed embodiments also avoid resource-intensive, computation-based prefetching approaches that use a separate helper thread to execute the instructions from the program ahead of time to prefetch delinquent loads. Moreover, it is hard to ensure that the helper thread is not so far ahead of the main thread that it actually ends up polluting the caches.

Disclosed embodiments improve a processor architecture and its prefetching performance in several ways. One advantage of disclosed embodiments is the potential for highly accurate prefetches with low overhead because the generated prefetcher is part of the main thread itself and there is no requirement for spare thread contexts or large memories. Moreover, since the prefetcher code (or custom hardware) is generated to stay a constant number of iterations ahead of the main computation, additional effort need not be expended to match the rates of the main thread and the prefetcher. Furthermore, with the prefetches inserted only at delinquent irregular load Instruction Pointers (IPs), cache and memory bandwidth interference are kept to a minimum.

In the course of describing the disclosed embodiments below, a number of terms are defined herein and are used as part of the descriptions of disclosed embodiments. As used herein, "delinquent" loads are those load instructions with the number of first level cache misses greater than a threshold (e.g., 1K, 10K, etc.). As further used herein, "address deltas" of a load instruction are defined as the numerical differences between the virtual addresses of its successive dynamic instances. Furthermore, in some embodiments, "irregular" loads are those load instructions having at least ten unique address deltas and the ten most popular unique deltas still covering less than 90% of all the deltas. Such a definition distinguishes regular patterns such as multidimensional arrays and other occasionally irregular (but predominantly striding) loads from irregular loads in the context of disclosed embodiments.

Figure 2:
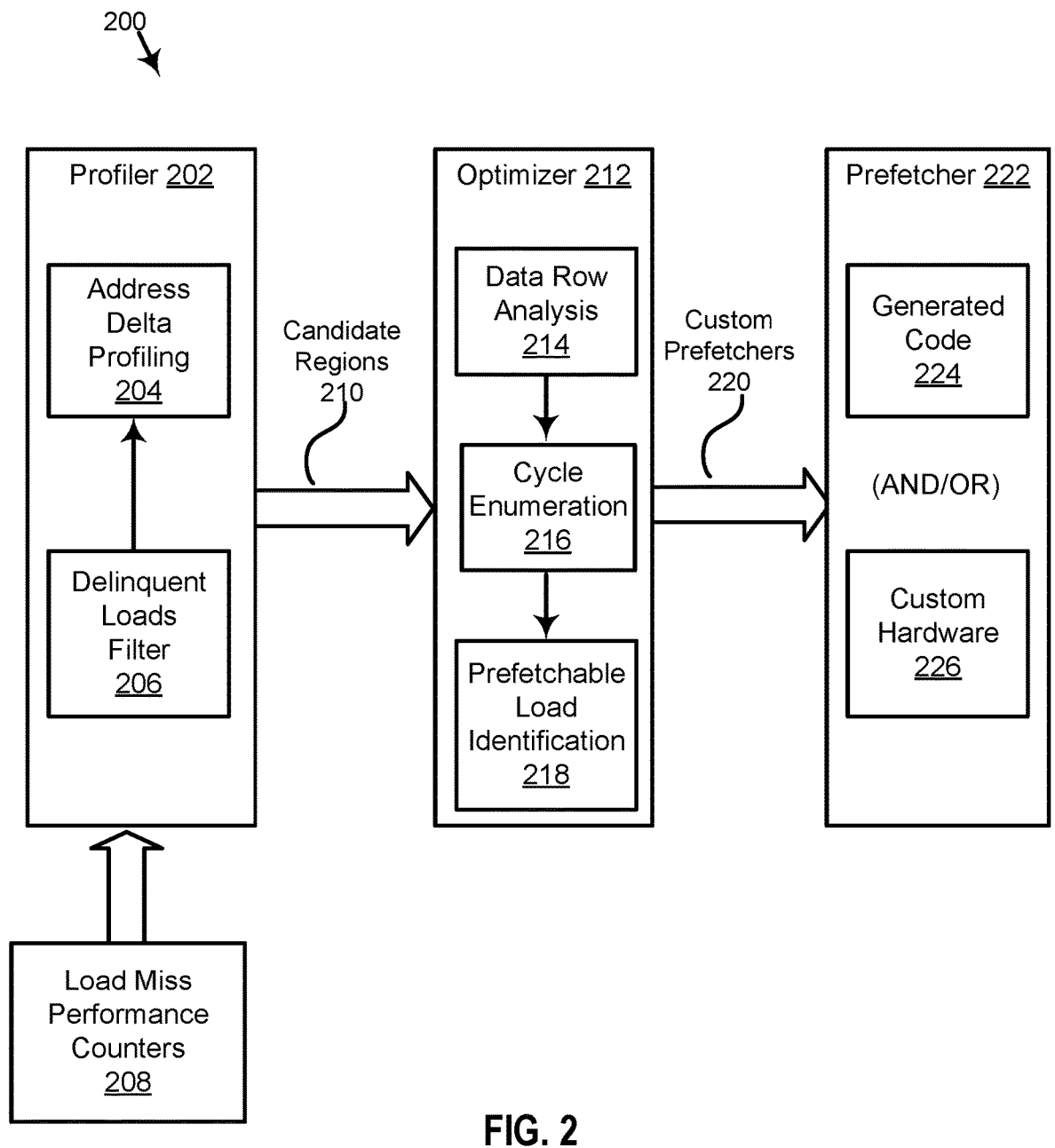
FIG. 2 is a block diagram of a system for generating application-specific custom prefetchers, according to some embodiments.

As described herein, and as illustrated with respect to FIG. 2, some disclosed embodiments consist of three parts: 1) a profiler, 2) an optimizer, and 3) a prefetcher.

Profiler

According to some embodiments, a profiler identifies delinquent irregular loads. In some embodiments, the profiler is a combination of both hardware and binary translator (BT) software. In such embodiments, the hardware tracks the data cache misses for each load instruction in flight in order to identify the delinquent loads. In some embodiments, the BT software runs a detailed address delta profiling on identified delinquent loads to classify them as regular or irregular loads.

When disclosed embodiments are incorporated into a processor that already has stride-detecting prefetchers, the address delta information natively available to the processor can also be passed on to the BT software for analysis. Incorporating disclosed embodiments into a processor may therefore improve the processor's prefetching performance without adding much if any cost.

The disclosed profiler in some embodiments operates online (at the same time as the thread being profiled), and in other embodiments operates offline (at a different time than the actual running time of the thread, for example by analyzing source code ahead of time).

Optimizer

Some disclosed embodiments further include an optimizer that analyzes the executing code to compute a backslice of the delinquent irregular load. As used herein, a backslice (a.k.a. backward slice) of the delinquent irregular load is a set of instructions in a program that are executed prior to, and contribute, either directly or indirectly, to the operands of a delinquent irregular load instruction. Based on the address deltas (received from the profiler) of instructions in the backslice, the optimizer then identifies "prefetchable" loads as those whose backslices are made entirely of non-memory operations or regular memory operations. The optimizer is then to generate custom prefetchers for a region of code that contains the prefetchable loads.

Custom Prefetcher

Figure 7A:
FIG. 7A illustrates an exemplary application-specific custom software prefetcher, according to some embodiments.
Figure 7B:
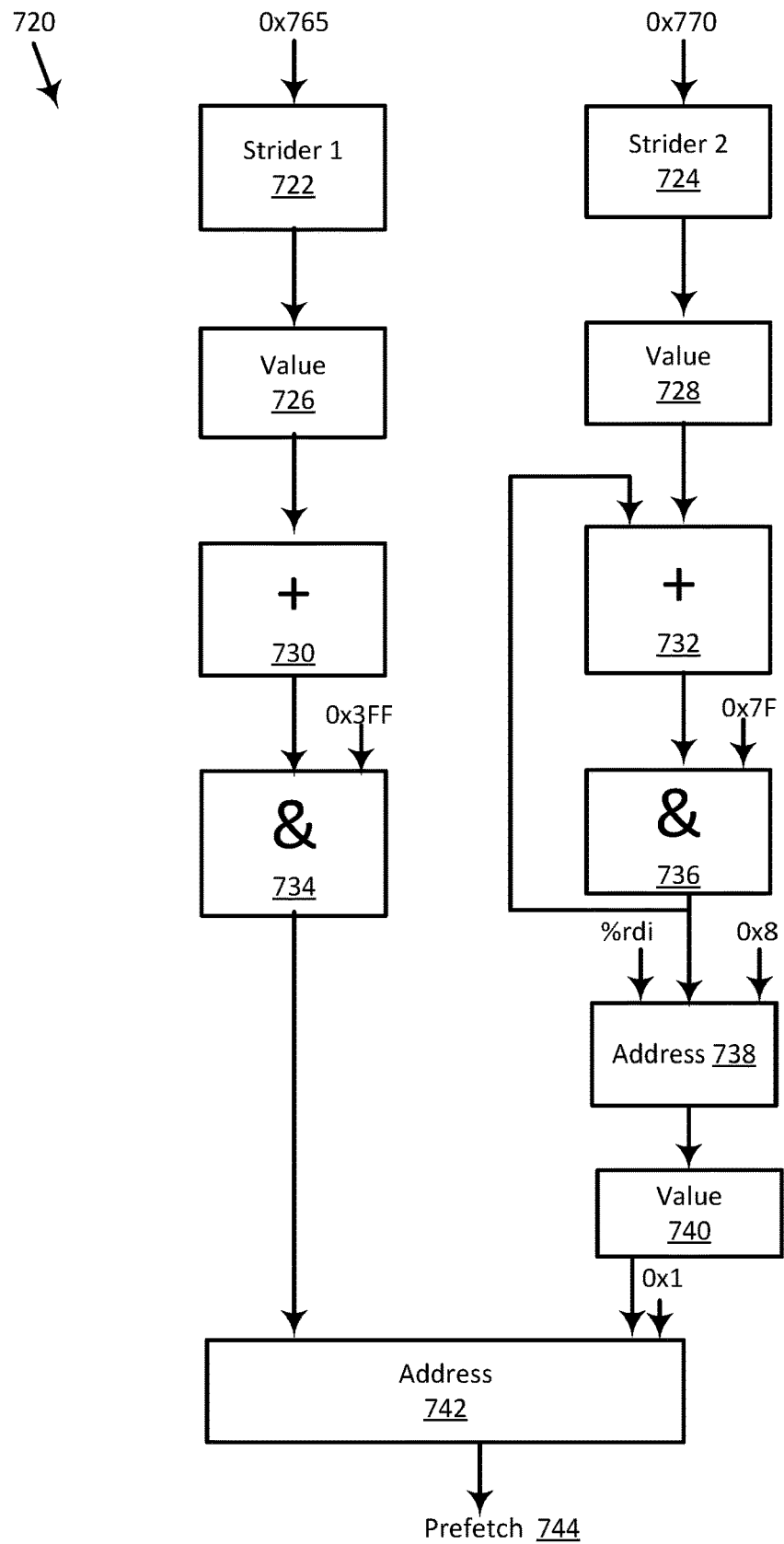
FIG. 7B illustrates an exemplary application-specific custom hardware prefetcher that corresponds to the custom software prefetcher of FIG. 7A, according to some embodiments.

The custom prefetchers generated by the optimizer can be either in software (generated code with prefetch hint instructions; see, e.g., FIG. 7A) or hardware (custom hardware that captures the dataflow of the address computation; see, e.g., FIG. 7B).

It should be understood that the 1) profiler, 2) optimizer, and 3) prefetcher are described as separate components herein for the sake of simplicity. Indeed, in some embodiments, all three of the 1) profiler, 2) optimizer, and 3) prefetcher are incorporated in and part of what is broadly referred to as "execution circuitry." The same is true regarding the binary translator described herein. In some embodiments, the binary translator is incorporated in "execution circuitry," while in other embodiments, the BT is separate from and external to execution circuitry.

FIG. 1A is a block diagram illustrating processing components for executing instructions, according to some embodiments. As illustrated, storage 101 stores instruction(s) 103 to be executed. As described further below, in some embodiments, computing system 100 is an SIMD processor to concurrently process multiple elements of packed-data vectors, such as matrices.

In operation, instruction(s) 103 is fetched from storage 101 by fetch circuitry 105. Each fetched instruction 107 is decoded by decode circuitry 109. The instruction(s) format is illustrated and described with respect to FIGS. 8A-B, and 9A-D. Decode circuitry 109 decodes each fetched instruction 107 into one or more operations. In some embodiments, this decoding includes generating a plurality of micro-operations to be performed by execution circuitry (such as execution circuitry 117). The decode circuitry 109 also decodes instruction suffixes and prefixes (if used). Execution circuitry 117 is further described and illustrated below with respect to FIGS. 2-3, 11A-B and 12A-B.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded SMM instruction 111 for execution on execution circuitry 117 out of an instruction pool (e.g., using a reservation station in some embodiments). Register rename/register allocation, and/or scheduling circuit 113 is optional, as indicated by its dashed border, insofar as the renaming, allocation, and/or scheduling may occur at a different time, or not at all.

Registers (register file) and/or memory 115 store data as operands of decoded instruction 111 to be operated on by execution circuitry 117. In some embodiments, as shown, execution circuitry 117 includes binary translator 118, which includes BT cache 119, and which is further illustrated and described with respect to FIGS. 2-3. Binary translator 118 is optional, as indicated by its dashed border, insofar as it may be incorporated in execution circuitry 117 (as shown), might be external to execution circuitry 117 (as shown in FIG. 1B), might instead be implemented in software, or as a combination of hardware and software.

In some embodiments, register file and/or memory 115 includes a cache hierarchy, including L1, L2, and L3 (or LLC) caches. In some embodiments, the caches are unified and other embodiments have separate data and instruction caches. Exemplary register types include writemask registers, packed data registers, general purpose registers, and floating-point registers, as further described and illustrated below, at least with respect to FIG. 10.

In some embodiments, write back circuit 120 commits the result of the execution of the decoded instruction 111. Execution circuitry 117 and system 100 are further illustrated and described with respect to FIGS. 2-3, 11A-B and 12A-B.

Figure 1B:
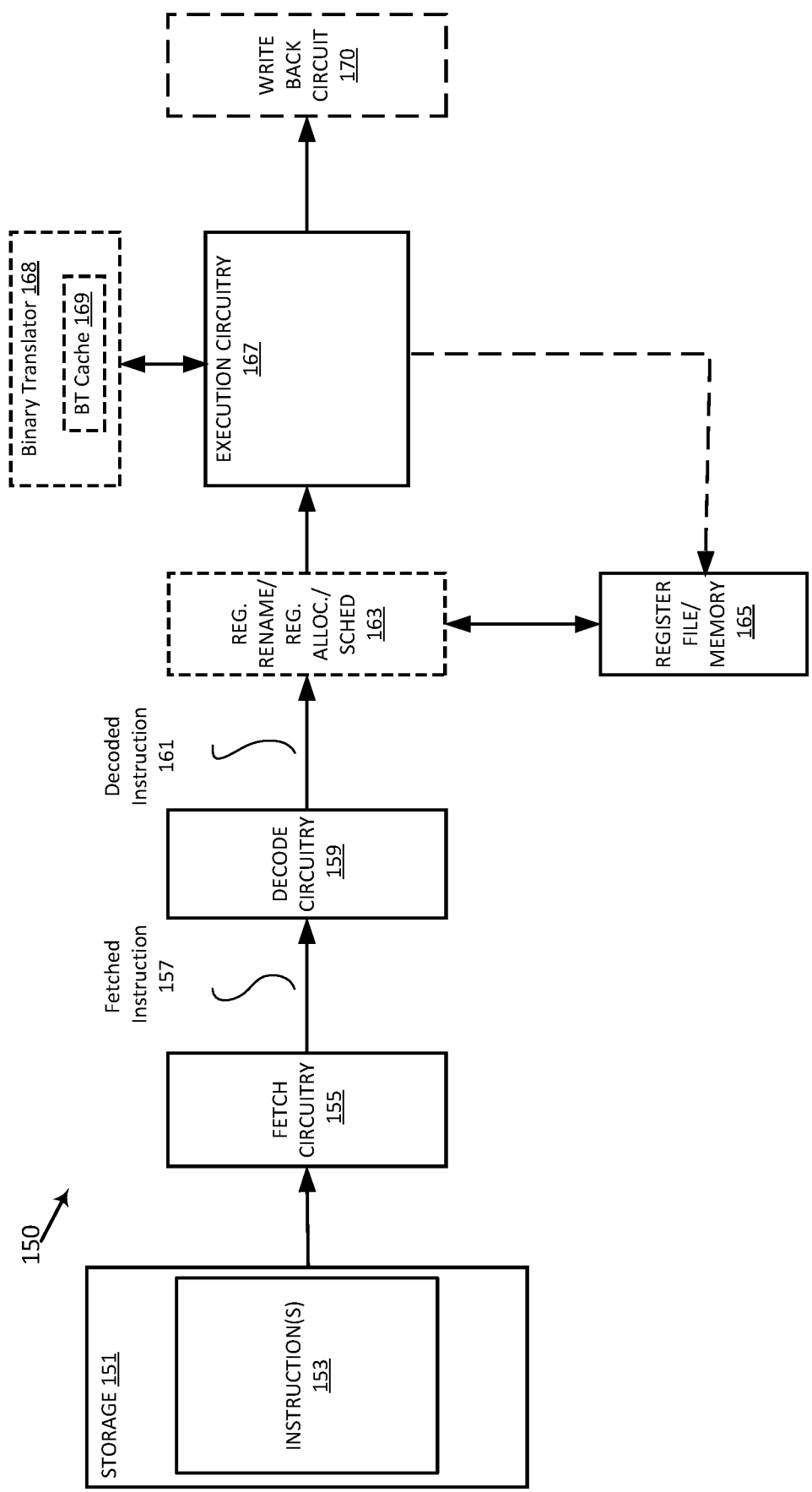
FIG. 1B is a block diagram illustrating processing components for executing instructions, according to some embodiments.

FIG. 1B is a block diagram illustrating processing components for executing instructions, according to some embodiments. As illustrated, storage 151 stores instruction(s) 153 to be executed. As described further below, in some embodiments, computing system 150 is an SIMD processor to concurrently process multiple elements of packed-data vectors, such as matrices.

In operation, instruction(s) 153 is fetched from storage 151 by fetch circuitry 155. Each fetched instruction 157 is decoded by decode circuitry 159. The instruction(s) format is illustrated and described with respect to FIGS. 8A-B, and 9A-D. Decode circuitry 159 decodes each fetched instruction 157 into one or more operations. In some embodiments, this decoding includes generating a plurality of micro-operations to be performed by execution circuitry (such as execution circuitry 167). The decode circuitry 159 also decodes instruction suffixes and prefixes (if used). Execution circuitry 167 is further described and illustrated below with respect to FIGS. 2-3, 16A-B and 17A-B.

In some embodiments, register renaming, register allocation, and/or scheduling circuit 163 provides functionality for one or more of: 1) renaming logical operand values to physical operand values (e.g., a register alias table in some embodiments), 2) allocating status bits and flags to the decoded instruction, and 3) scheduling the decoded SMM instruction 161 for execution on execution circuitry 167 out of an instruction pool (e.g., using a reservation station in some embodiments). Register rename/register allocation, and/or scheduling circuit 163 is optional, as indicated by its dashed border, insofar as the renaming, allocation, and/or scheduling may occur at a different time, or not at all.

Registers (register file) and/or memory 165 store data as operands of decoded instruction 161 to be operated on by execution circuitry 167. Also shown is binary translator 168, which includes BT cache 169, and which is further illustrated and described with respect to FIGS. 2-3. Binary translator 168 is optional, as indicated by its dashed border, insofar as it may be incorporated in execution circuitry 167 (as shown in FIG. 1A), might be external to execution circuitry 167 (as shown), might instead be implemented in software, or as a combination of hardware and software.

In some embodiments, register file and/or memory 165 includes a cache hierarchy, including L1, L2, and L3 (or LLC) caches. In some embodiments, the caches are unified and other embodiments have separate data and instruction caches. Exemplary register types include writemask registers, packed data registers, general purpose registers, and floating-point registers, as further described and illustrated below, at least with respect to FIG. 15.

In some embodiments, write back circuit 170 commits the result of the execution of the decoded instruction 161. Execution circuitry 167 and system 150 are further illustrated and described with respect to FIGS. 2-3, 16A-B and 17A-B.

FIG. 2 is a block diagram of a system for generating application-specific custom prefetchers, according to some embodiments. As shown, system 200 includes profiler 202, optimizer 212, and prefetcher 222. Profiler 202, which receives load miss performance counters 208, includes address delta profiling 204 and delinquent loads filter 206, and identifies and sends candidate regions 210 to optimizer 212. Optimizer 212, which includes data row analysis 214, cycle enumeration 216, and prefetchable load identification 218, generates and sends custom prefetchers 220 to prefetcher 222. Prefetcher 222 includes generated code 224 or custom hardware 226.

Figure 3A:
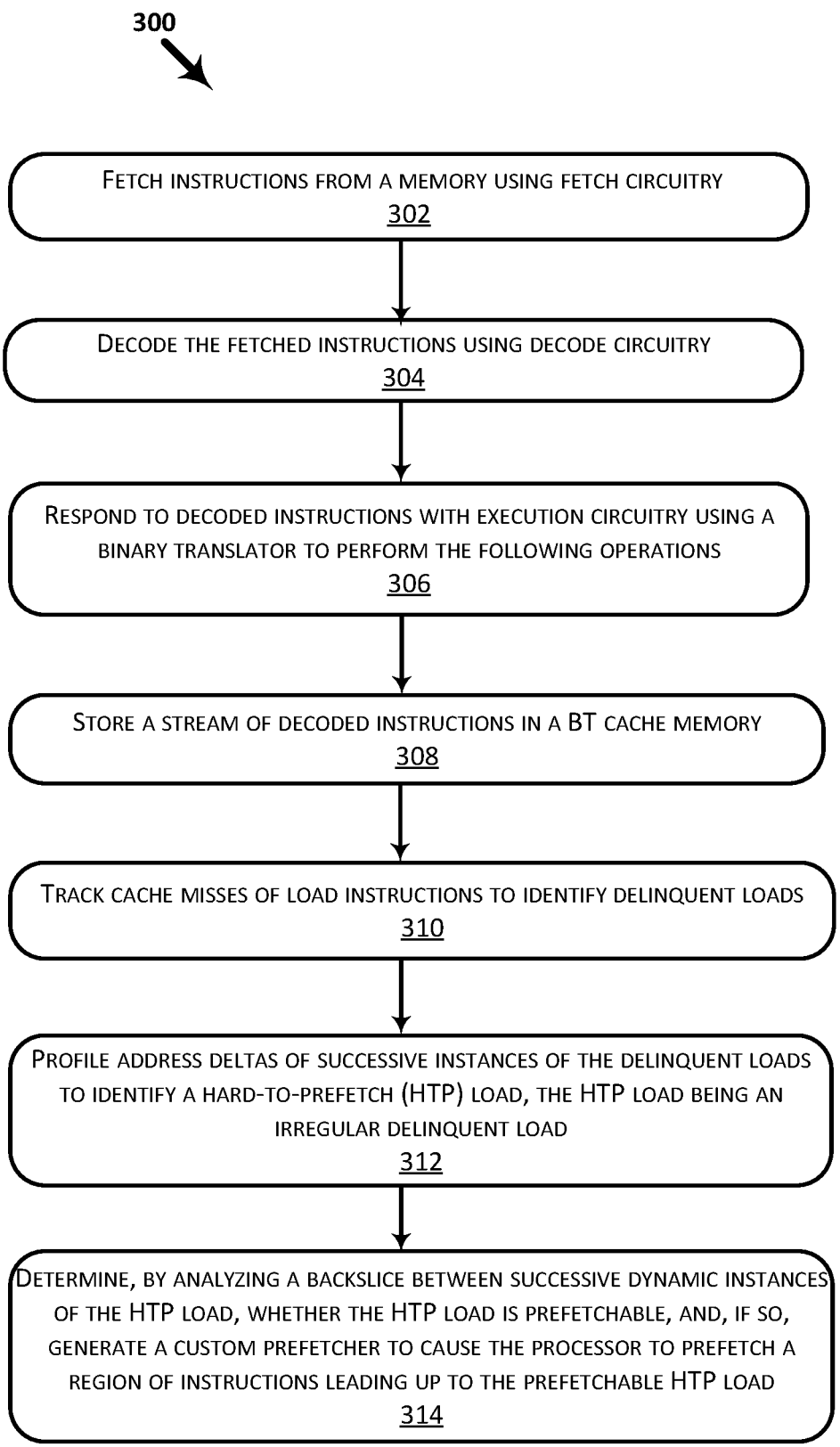
FIG. 3A is a block flow diagram of operations performed by a processor to generate application-specific custom prefetchers, according to some embodiments.

FIG. 3A is a block flow diagram of operations performed by a processor to generate application-specific custom prefetchers, according to some embodiments. A processor is to perform flow 300. As shown, at 302, the processor is to fetch instructions from a memory using fetch circuitry, such as fetch circuitry 105 (FIG. 1). In some embodiments, that memory is an L1 instruction cache. In other embodiments, that memory is an L2 or higher level cache, and in yet other embodiments, that memory is main memory. At 304, the processor is to decode the fetched instructions using decode circuitry such as decode circuitry 109 (FIG. 1). At 306, the processor is to respond to decoded instructions with execution circuitry using a binary translator to perform the operations 308-314. Specifically, at 308, the processor is to store a stream of decoded instructions in a BT cache memory. In some embodiments, the BT cache memory is separate from the memory 115 shown in FIG. 1. At 310, the processor is to track cache misses of load instructions to identify delinquent loads. At 312, the processor is to profile address deltas of successive instances of the delinquent loads to identify a delinquent irregular load. At 314, the processor is to determine, by analyzing a backslice between successive dynamic instances of the DIRRL, whether the DIRRL is prefetchable, and, if so, generate a custom prefetcher to cause the processor to prefetch a region of instructions leading up to the prefetchable DIRRL. What is meant by a "backslice," as used herein, is further illustrated and described with respect to FIGS. 4, 5A, and 6A.

Figure 3B:
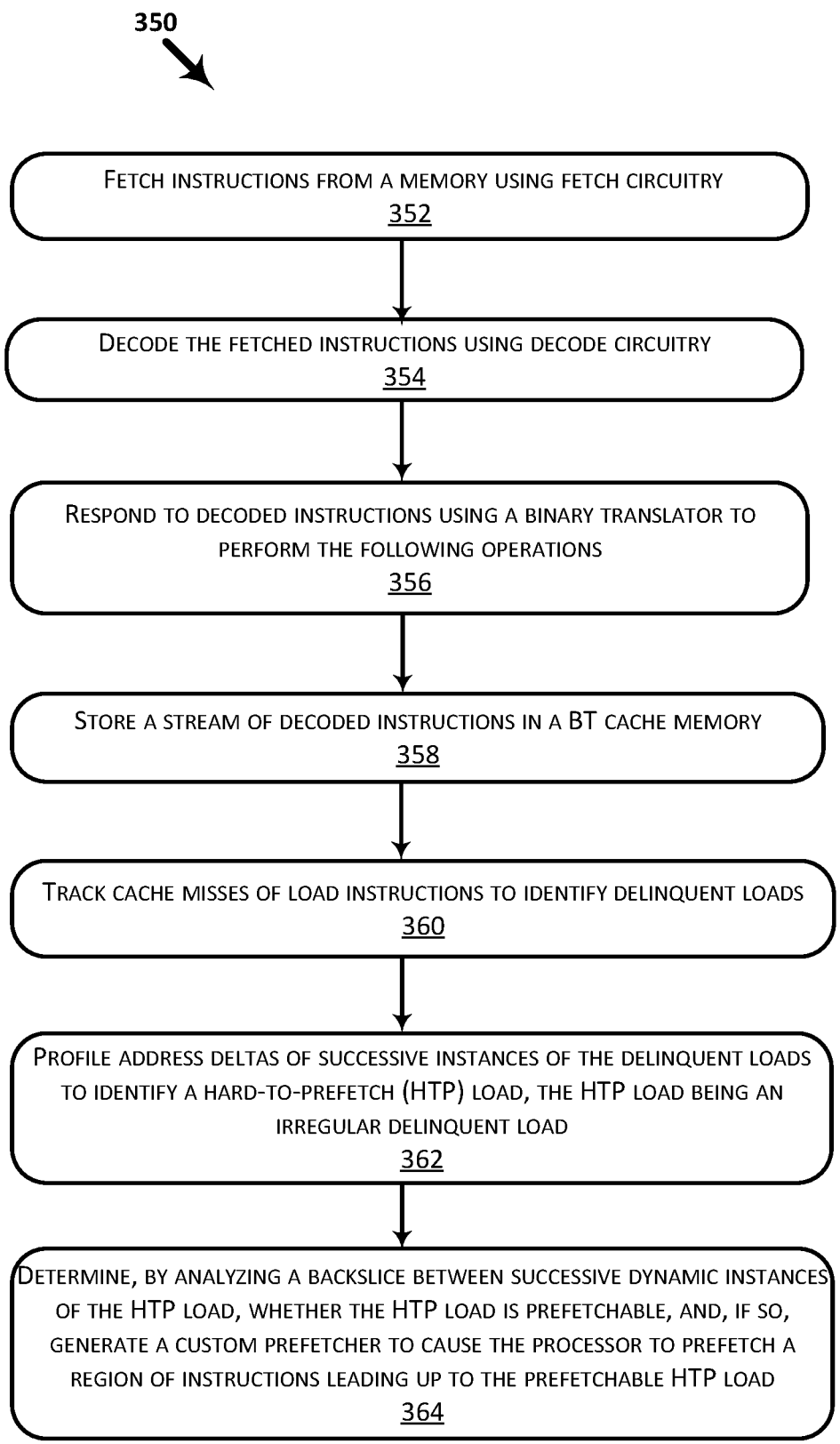
FIG. 3B is a block flow diagram of operations performed by a processor to generate application-specific custom prefetchers, according to some embodiments.

FIG. 3B is a block flow diagram of operations performed by a processor to generate application-specific custom prefetchers, according to some embodiments. A processor is to perform flow 350. As shown, at 352, the processor is to fetch instructions from a memory using fetch circuitry, such as fetch circuitry 105 (FIG. 1). In some embodiments, that memory is an L1 instruction cache. In other embodiments, that memory is an L2 or higher level cache, and in yet other embodiments, that memory is main memory. At 354, the processor is to decode the fetched instructions using decode circuitry such as decode circuitry 109 (FIG. 1). At 356, the processor is to respond to decoded instructions using a binary translator to perform the operations 358-364. Specifically, at 358, the processor is to store a stream of decoded instructions in a BT cache memory. In some embodiments, the BT cache memory is separate from the memory 115 shown in FIG. 1. At 360, the processor is to track cache misses of load instructions to identify delinquent loads. At 362, the processor is to profile address deltas of successive instances of the delinquent loads to identify a delinquent irregular load. At 364, the processor is to determine, by analyzing a backslice between successive dynamic instances of the DIRRL, whether the DIRRL is prefetchable, and, if so, generate a custom prefetcher to cause the processor to prefetch a region of instructions leading up to the prefetchable DIRRL. What is meant by a "backslice," as used herein, is further illustrated and described with respect to FIGS. 4, 5A, and 6A.

FIG. 4A is a code listing illustrating a backslice, according to some embodiments. As shown, code listing 400 defines an exemplary function, foo( ). For ease of discussion, the code listing is illustrated in a relatively easy-to-understand C programming language syntax. Some embodiments, for example those analyzing code segments offline and ahead of time, are able to generate application-specific custom prefetchers by analyzing code segments in a high-level programming language, such as C. But some embodiments, using a hardware binary translator dynamically and on-line to generate application specific custom prefetchers, analyze instructions having an assembly code format. For example, code segments with assembly instruction format are illustrated and described with respect to FIGS. 5A, 6A, and 7A. In some embodiments, the code to be analyzed consists of macro-operations generated by decode circuitry, such as decode circuitry 109 (FIG. 1).

As shown, the instruction at line 0160 is the target instruction 402, and the "backslice" is to be computed leading up to the target instruction. A "backslice," as used herein, is the set of all instructions that contribute, either directly or indirectly, to the computation conducted in the target instruction. In some embodiments, the instructions to be included in the backslice can be identified by working backwards from the target instruction 402 to identify all contributing instructions that make up backslice 404. For example, the instruction at line 0140 directly contributes to the target instruction 402 because it sets an operand of the instruction. Working backwards from the instruction at 0140, the instructions at lines 0110, 0090, and 0070 are to be included in backslice 404 because they indirectly contribute to the computation of the target instruction 402. In some embodiments, as here, the target instruction 402 is part of a loop, and the backslice extends backward to, but stops at the start of a current iteration.

Notably, some of the instructions in code listing 400 do not directly or indirectly contribute to the computation of target instruction 402 and are therefore not included in the backslice 404. Instructions at lines 0080, 0100, 0120, and 0150, for example, are not included in the backslice. Instructions at lines 0130 and 0170, even though they affect an operand, 'c,' used in target instruction 402, are not included in the backslice because the values of 'c' that are set by those instructions are overwritten before reaching target instruction 402.

Figure 4B:
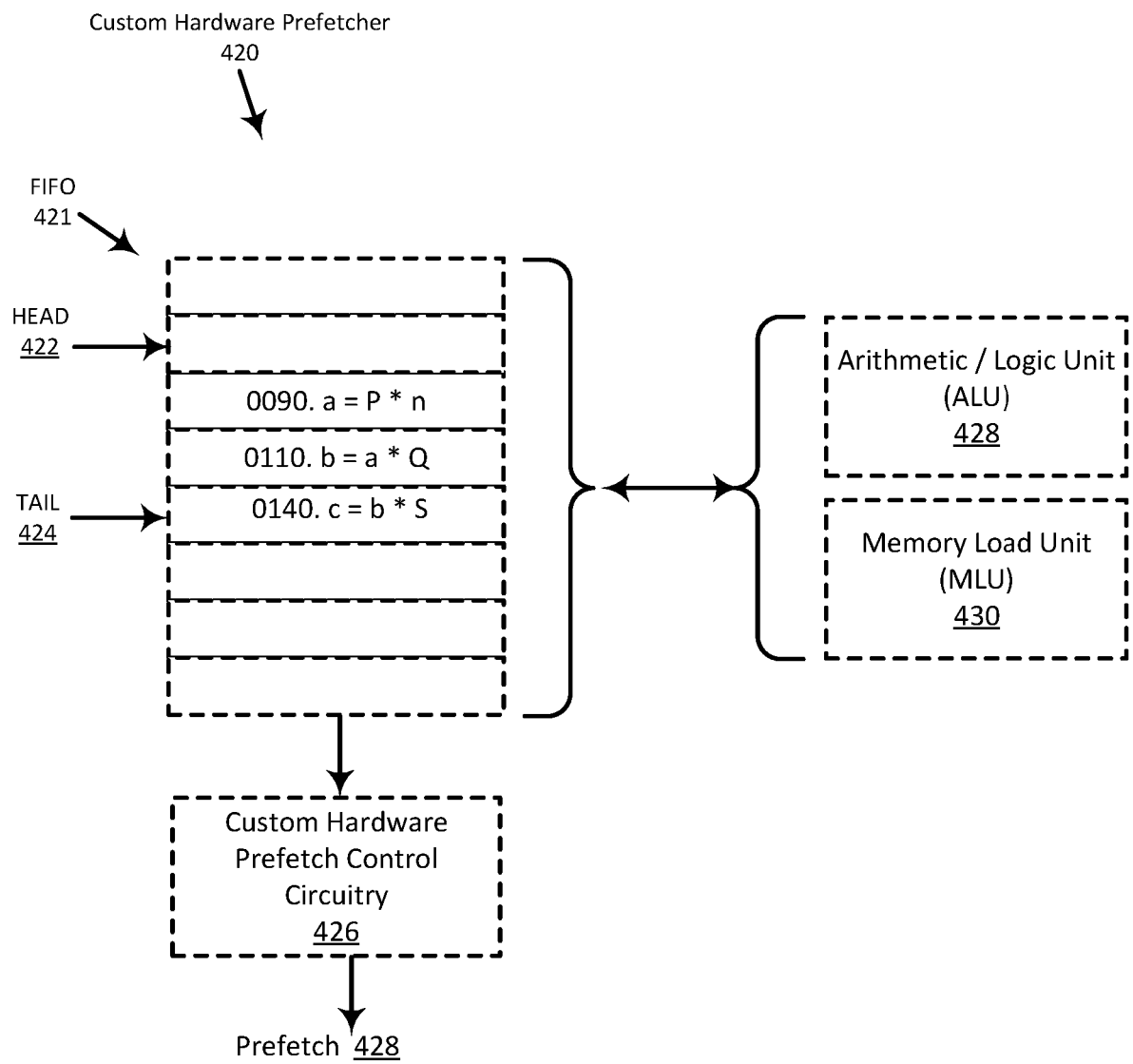
FIG. 4B is a custom hardware prefetcher generated for the code listing of FIG. 4A, according to some embodiments.

FIG. 4B is a custom hardware prefetcher generated for the code listing of FIG. 4A, according to some embodiments. As shown, custom hardware prefetcher 420 includes a first-in, first-out (FIFO) buffer 421, which has pointers for a head 422 and a tail 424, and in which the instructions at lines [0090], [0110], and [0140] from code listing 400 (FIG. 4A) have been enqueued. Also shown are custom hardware prefetch control circuitry 426, arithmetic/logic unit (ALU) 428, and memory load unit (MLU) 430.

For simplicity, and to illustrate operation of disclosed embodiments, the instructions enqueued in FIFO 421 are shown according to the format of a high-level programming language, such as Basic, C, Fortran, or C++. In some embodiments, however, those instructions are to instead be stored as decoded micro-operations or macro-operations generated by decode circuitry, such as decode circuitry 109 (FIG. 1A) or 159 (FIG. 1B), In operation, custom hardware prefetch control circuitry 426 is to cause one or more instructions within a region of instructions leading up to target instruction 402 (FIG. 4A) to be enqueued in FIFO 421, and to subsequently cause the processor to perform resulting arithmetic operations, if any, using ALU 428, and memory loads, if any, using MLU 430.

In other embodiments, different instructions from code listing 400 are selected for inclusion in FIFO 421. For example, if one of the instructions is identified as a "critical load," as described below, control circuitry 426 could cause the processor to focus on that instruction by only enqueueing that instruction and no others. In some embodiments, the entire backslice 404 (FIG. 4A) is added to FIFO 421 and performed by the processor.

FIFO 421, custom hardware prefetch control circuitry 426, ALU 428, and MLU 430 are all optional, as indicated by their dashed borders, insofar as they may use hardware resources already included in the processor, they may use firmware or software, or they may not be included at all.

FIFO 421, for example, could be implemented within a memory already available to the processor. Some embodiments implement FIFO 421 using registers in a register file of the processor. Some embodiments implement FIFO 421 using a few dedicated registers. Some embodiments use a different memory organization than FIFO 421, for example a random-access memory. ALU 428, for example, could include one or more dedicated ALUs to perform arithmetic operations. ALU 428, in some embodiments, uses existing processor execution unit(s) 1162 within execution cluster(s) 1160, as illustrated and described with respect to FIGS. 11A-B.

Figure 4C:
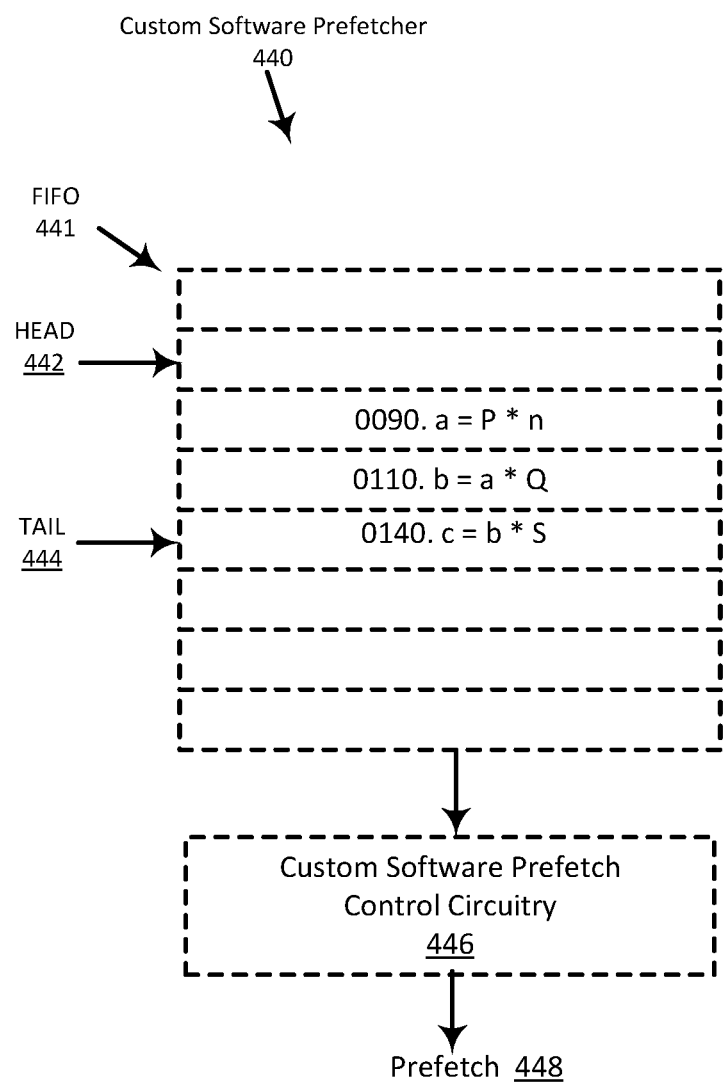
FIG. 4C is a custom software prefetcher generated for the code listing of FIG. 4A, according to some embodiments.

FIG. 4C is a custom software prefetcher generated for the code listing of FIG. 4A, according to some embodiments. As shown, custom software prefetcher 440 includes a first-in, first-out (FIFO) buffer 441, which has pointers for a head 442 and a tail 444, and in which the instructions at lines [0090], [0110], and [0140] from code listing 400 (FIG. 4A) have been enqueued. The enqueued instructions in FIFO 441 are meant to serve as prefetch hints. Also shown is custom software prefetch control circuitry 446.

For simplicity, and to illustrate operation of disclosed embodiments, the instructions enqueued in FIFO 441 are shown according to the format of a high-level programming language, such as Basic, C, Fortran, or C++. In some embodiments, however, those instructions are to instead be stored as decoded micro-operations or macro-operations generated by decode circuitry, such as decode circuitry 109 (FIG. 1A) or 159 (FIG. 1B), In operation, custom software prefetch control circuitry 446 is to cause one or more instructions within a region of instructions leading up to target instruction 402 (FIG. 4A) to be enqueued in FIFO 441, and to subsequently serve as prefetch hints to be performed by the processor.

In other embodiments, different instructions from code listing 400 are selected for inclusion in FIFO 441. For example, if one of the instructions is identified as a "critical load," as described below, control circuitry 446 could cause the processor to focus on that instruction by only enqueueing that instruction and no others. In some embodiments, control circuitry 446 cause the processor, when performing the prefetching, to focus on the one or more critical loads by performing the critical loads before performing non-critical loads. In some embodiments, the entire backslice 404 (FIG. 4A) is added to FIFO 441 and performed by the processor.

FIFO 441 and custom software prefetch control circuitry 446 are optional, as indicated by their dashed borders, insofar as they may use resources already included in the processor, or they may not be included at all. FIFO 441, for example, could be implemented within a memory already available to the processor. For example, the one or more hints enqueued in FIFO 441 could instead be stored among the instructions in the memory. Some embodiments implement FIFO 441 using registers in a register file of the processor. Some embodiments implement FIFO 441 using a few dedicated registers. Some embodiments use a different memory organization than FIFO 441, for example a random-access memory. Control circuitry 446 in some embodiments, causes the processor to respond to the enqueued hints using its existing execution pipeline, as illustrated and described with respect to FIGS. 11A-B.

Identifying a Backslice of Exemplary Assembly Code Listing, Trace 1

Figure 5A:
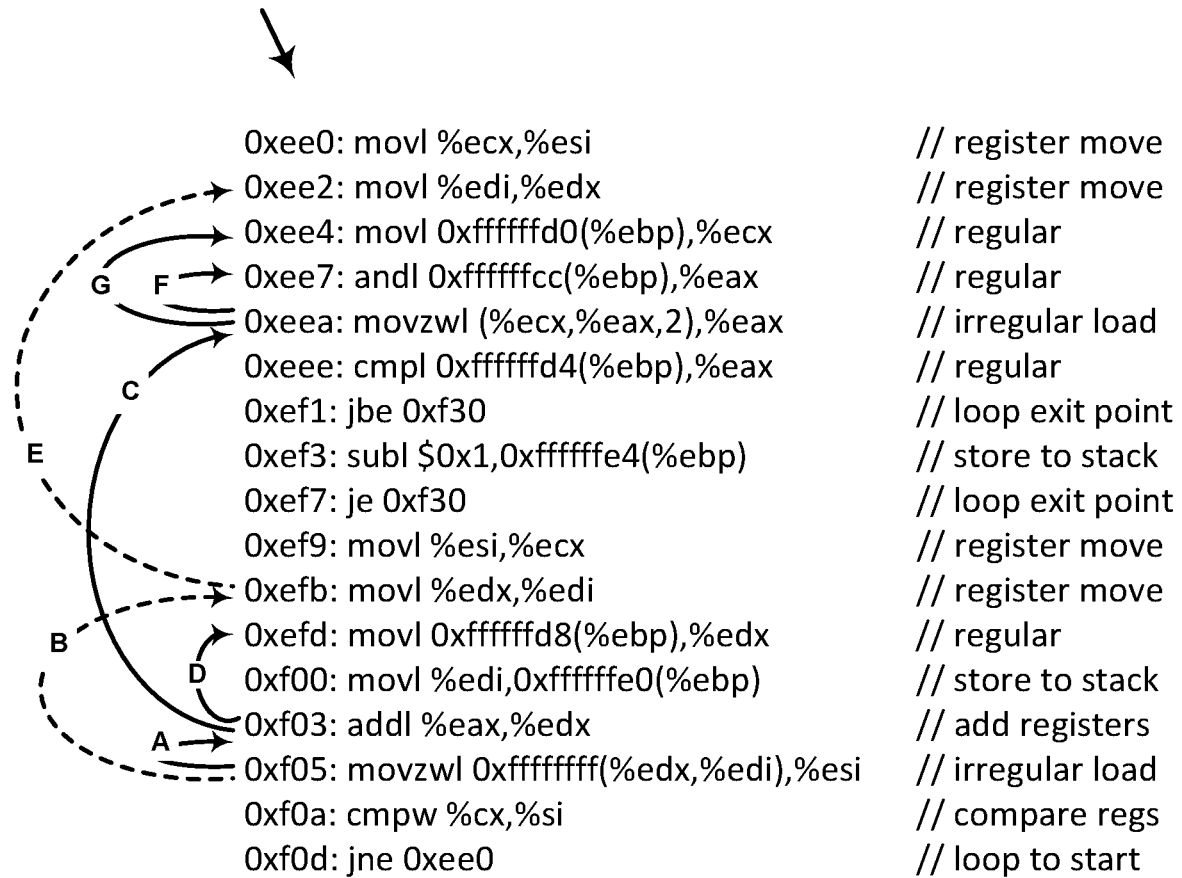
FIG. 5A is a code listing of a region of instructions leading up to a delinquent irregular load, according to some embodiments.

FIG. 5A is a code listing of instructions to be profiled by a profiler then optimized by an optimizer, according to some embodiments. As shown, each of the instructions in assembly code listing, Trace 1 500, includes an address, an opcode, operands, and a comment indicating its instruction type. Trace 1 500 is sometimes referred to as a "hot region," and here is a simple 17-instruction loop with the 17th instruction looping back to the 1st instruction, and with two exit branches to exit past the end of the loop (0xef1 and 0xef7) that are rarely taken. Trace 1 500 has two irregular loads (0xeea and 0xf05), two stores to the stack (0xef3 and 0xf00) and the remaining loads are constant address stack loads.

Also illustrated are arcs defining the backslice of Trace 1 500. Starting with the last irregular load in the loop, at 0xf05, arcs A and B identify the dependencies on 0xf03 and 0xefb, respectively. Dashed lines are used here just to allow for more easily distinguishing among the seven arcs. Continuing backward from 0xf03, arcs C and D identify the dependencies on 0xeea and 0xefd, respectively. Continuing backward from 0xefb, arc E identifies the dependency on 0xee2. Finally, continuing backward from 0xeea, arcs F and G identify the dependencies on 0xee7 and 0xee4, respectively.

Figure 5B:
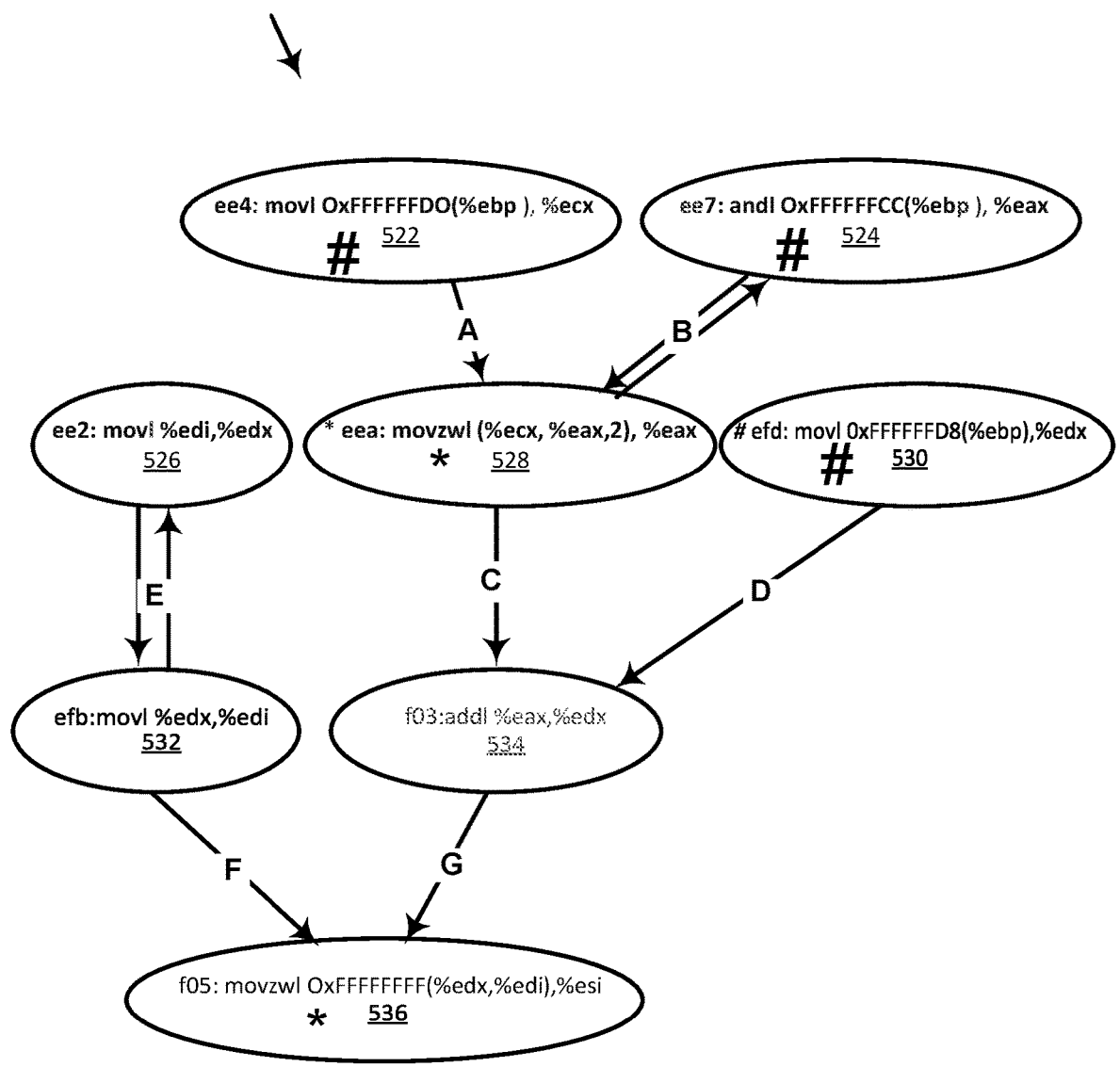
FIG. 5B is a block flow diagram illustrating the flow of instructions of the code listing in FIG. 5A, according to some embodiments.

Figure 5B illustrates the backslice of the flow of instructions of FIG. 5A as a block flow diagram. As shown, seven arcs, labeled A through G, identify the same seven arcs between the same eight backslice instructions of Trace 1500, which are here represented by eight flow diagram nodes. Specifically, eight flow diagram nodes, labeled as 522, 524, 526, 528, 530, 532, 534, and 536 correspond to the eight instructions at Trace 1 500 addresses 0xee4, 0xee7, 0xee2, 0xeea, 0xefd, 0xefb, 0xf03, and 0xf05, respectively.

In operation, according to some embodiments, as further described below with respect to FIGS. 5A-B and 6A-B, a processor, having a binary translator (BT) having a BT cache, stores the stream of instructions of Trace 1 500 to the BT cache. The binary translator, using a profiler, identifies a delinquent irregular load (DIRRL). Then, using an optimizer, the BT determines, as described below, whether the DIRRL is prefetchable, and, if so, generates a custom prefetcher to cause the processor to prefetch a region of instructions leading up to the prefetchable DIRRL. The generated custom prefetcher can be implemented in software and/or hardware.

Backslice Analysis and Prefetcher Generation for Exemplary Trace 2

Figure 6A:
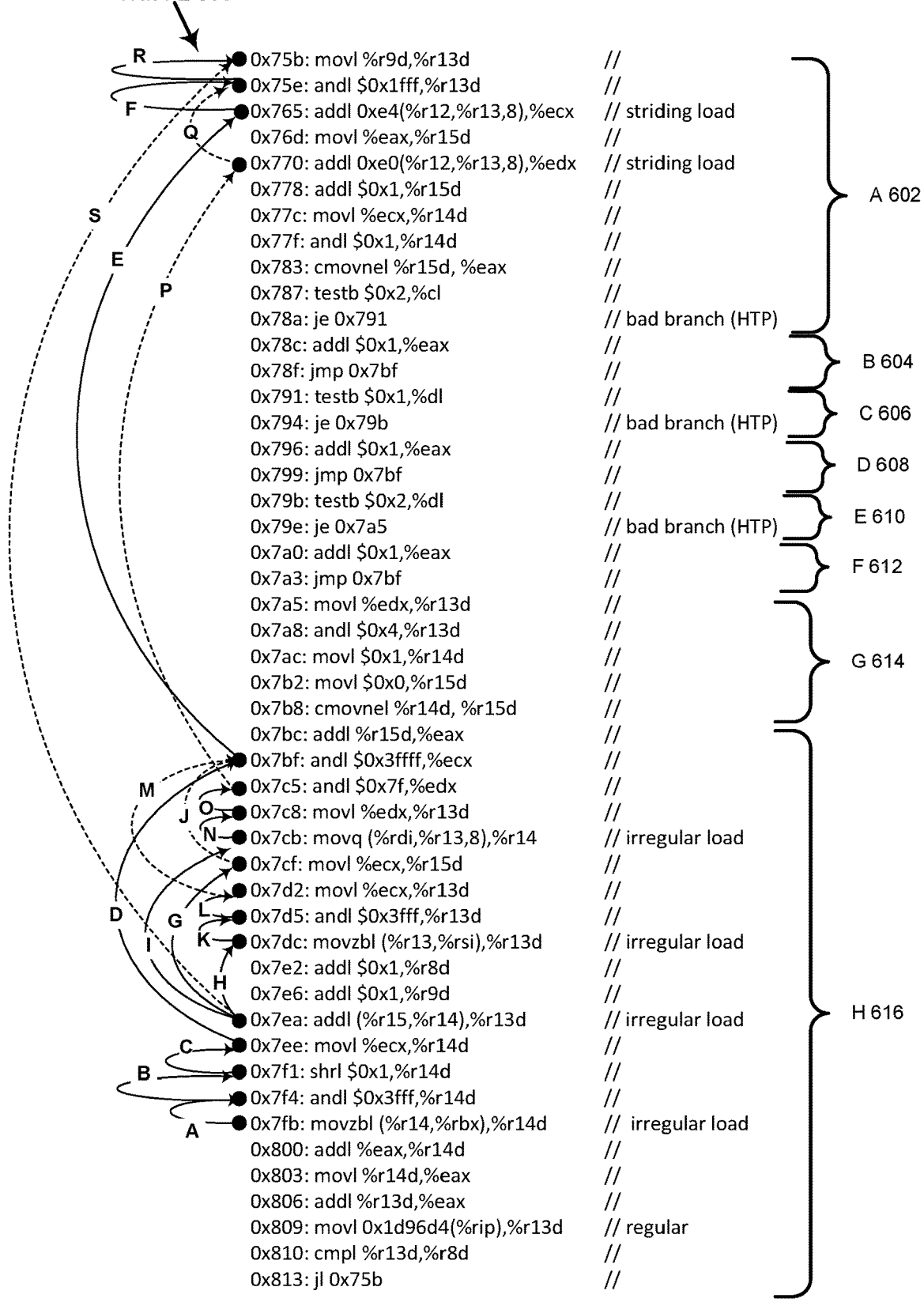
FIG. 6A is a code listing of a region of instructions leading up to a delinquent irregular load, according to some embodiments.

FIG. 6A is a code listing of assembly instructions to be profiled by a profiler then optimized by an optimizer, according to some embodiments. As shown, each of the instructions in assembly code listing, Trace 2 600, includes an address, an opcode, and operands, and some have a comment indicating their instruction types. Trace 2 600 is sometimes referred to as a "hot region," and here is also a loop (with 48 instructions) but with more complex control flow (shown in FIGS. 6B and 6C). It has two striding loads (0x765 and 0x770) and four irregular loads (0x7cb, 0x7dc, 0x7ea, 0x7fb), but no stores. It also has three branches with high misprediction rates on common branch prediction circuitry.

Also illustrated are arcs defining the backslice of Trace 2 600. Starting with the last irregular load in the loop, the delinquent irregular load at 0x7fb, arcs A, B, D, E, F, R, and S identify the chain of dependencies all the way back through instructions at 0x7f4, 0x7f1, 0x7ee, 0x7bf, 0x765, 0x75e, 0x75b, and 0x7e6, respectively. Dashed lines are used here just to allow for more easily distinguishing among the arcs. Starting with the penultimate irregular load at 0x7ea, arcs G and J identified dependencies to 0x7cf and 0x7bf, respectively, arcs H, K, L, and M identify dependencies to 0x7dc, 0x7d5, 0x7d2, and 0x7bf, respectively, and arcs I, N, O, P, and Q identify dependencies to 0x7cb, 0x7c8, 0x7c5, 0x770, and 0x75e, respectively.

For ease of illustration and discussion, code listing Trace 2 600 has been divided into eight (8) regions, labeled A 602, B 604, C 606, D 608, E 610, F 612, G 614 and H 616, each of which ends with a branch instruction. The illustrated 8 regions are further described and illustrated in FIG. 6B, which includes nodes in a block flow diagram for each of the regions.

Figure 6B:
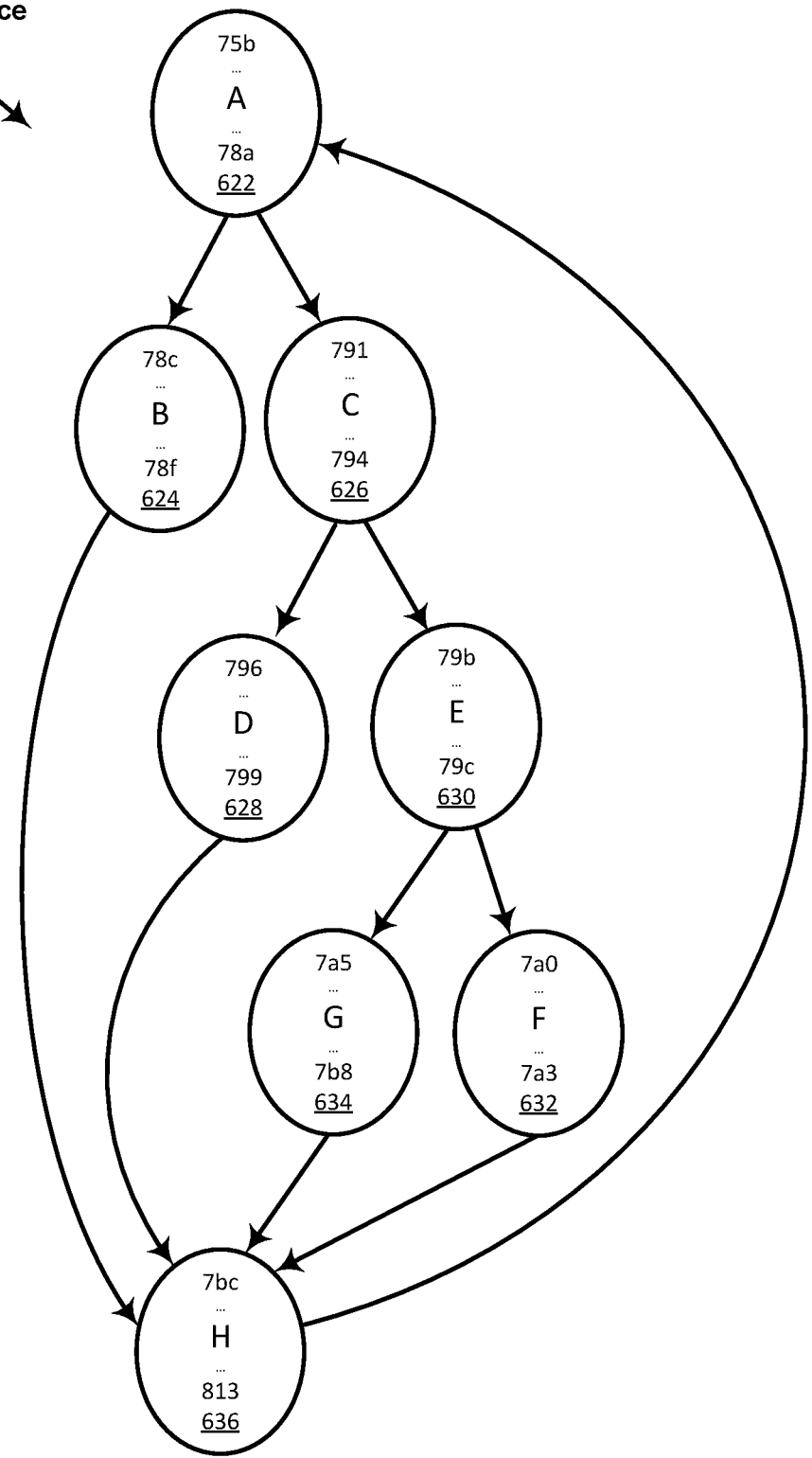
FIG. 6B is a block flow diagram illustrating the flow of instructions of the code listing in FIG. 6A, according to some embodiments.

FIG. 6B is a control flow diagram illustrating the backslice of the regions of Trace 2 600, as defined in FIG. 6A, as a block flow diagram. As shown, Trace 2 backslice 620 block flow diagram includes 9 nodes corresponding to the 8 nodes defined in FIG. 6A. Specifically, 8 nodes, 622, 624, 626, 628, 630, 632, 634 and 636 are labeled as A through H, and are bounded by the same instructions in each node as the regions in FIG. 6A.

Figure 6C:
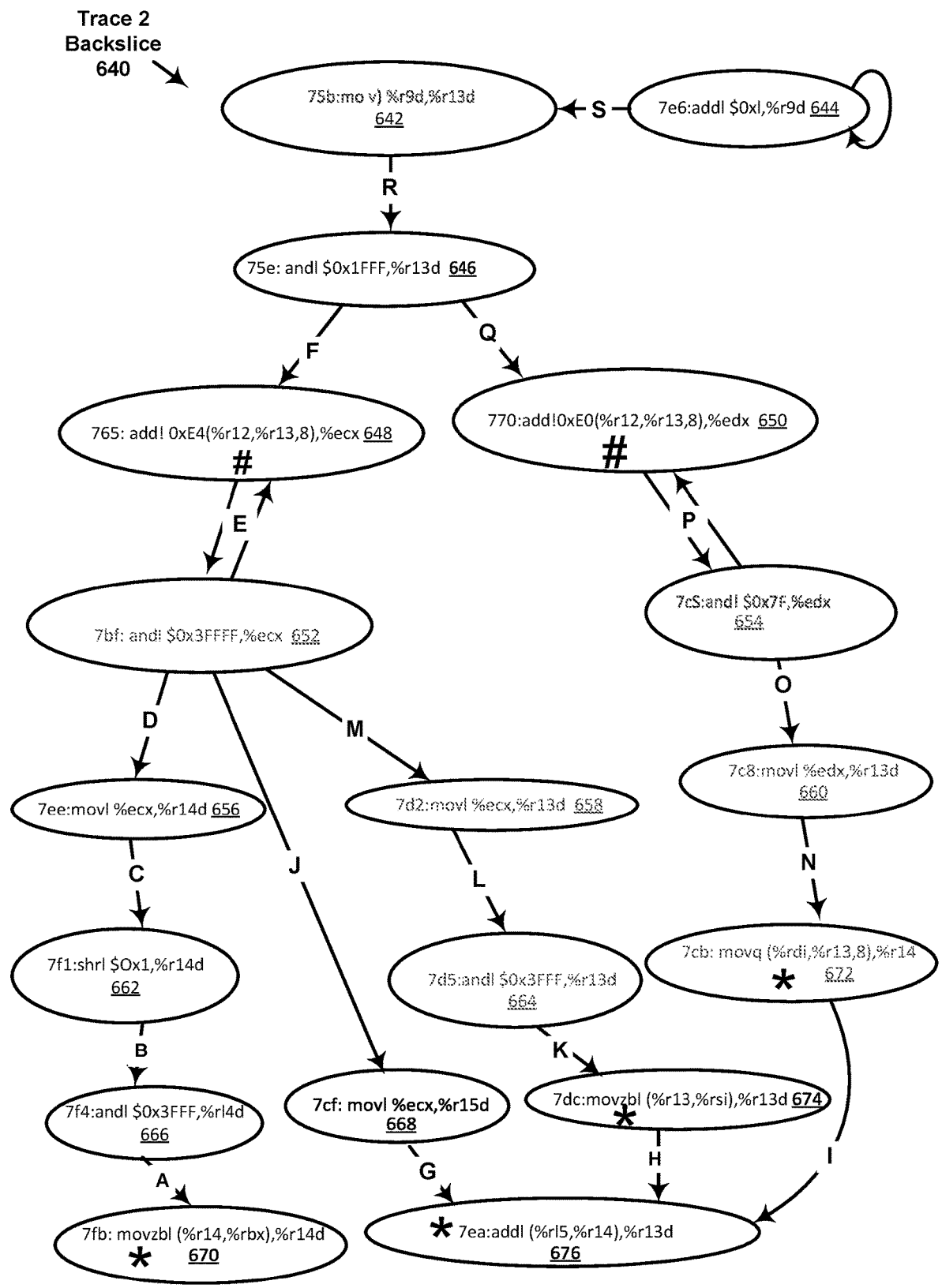
FIG. 6C is another, more detailed block flow diagram illustrating the flow of instructions of the code listing in FIG. 6A, according to some embodiments.

FIG. 6C illustrates the backslice of the flow of instructions of Trace 2 of FIG. 6A as a block flow diagram. As shown, Trace 2 backslice 640 block flow diagram includes 18 nodes, 642, 644, 646, 648, 650, 652, 654, 656, 658, 660, 662, 664, 666, 668, 670, 672, 674, and 676, corresponding to 18 backslice instructions, and 19 paths, labeled A through S, labeling dependencies among the backslice instructions. The illustrated paths among the nodes match the arcs among the instructions of Trace 2 in FIG. 6A.

The backslices of Trace 1 and Trace 2, as illustrated and described with respect to FIGS. 5B, 6B, and 6C, capture the dataflow between the successive iterations of an irregular load. A forward edge (from a lower instruction address to a higher instruction address) indicates the dataflow within an iteration while a backward edge (from a higher instruction address to a lower instruction address) indicates the dataflow from the previous iteration of the loop.

In FIGS. 5B and 6C, nodes representing regular and constant loads are marked with a "#" symbol and irregular loads are marked with a "*". It can be seen that the number of instructions in the backslice of the irregular loads is significantly smaller than the size of the loop (8<17 in Trace 1 and 18<48 in Trace 2). Disclosed embodiments are therefore advantageously able to prefetch all relevant dependencies to a target irregular load without having to prefetch all data accessed by the program.

Another advantage of disclosed embodiments is that the cycles in this backslice capture the critical relationship between successive iterations of the irregular load. A cycle describes the case where the computation performed by a later instruction depends on the output of an earlier instruction, and produces a new value that itself is depended-on by the earlier instruction when it is subsequently executed. For example, FIG. 5B exhibits two cycles; they are: (0xee7, 0xeea) and (0xee2, 0xefb). Of these, the latter is a trivial cycle consisting only of register moves and can be ignored. Similarly, there are three cycles in the region from Trace 2: (0x7e6), (0x765, 0x7bf) and (0x770, 0x7c5). These cycles capture the essential recurrence relationship between the virtual addresses of the successive dynamic instances of the irregular loads. It is to be noted that these cycles have significantly smaller number of instructions than the backslices themselves (4 vs. 8 in Trace 1 and 5 vs. 18 in Trace 2).

Optimizer Determines Whether "Prefetchable"

The optimizer determines whether a delinquent irregular load is prefetchable by analyzing a backslice of that instruction. "Prefetchable" loads are those whose backslices have cycles made entirely of non-memory operations or regular memory operations. If the irregular delinquent load is determined to be prefetchable, the optimizer generates custom prefetchers for a region of code that contains the prefetchable loads.

In some embodiments, all the cycles in the region from Trace 2 are made either of non-memory operations or regular memory operations. Since the backslices of 0x765 and 0x770 only contain a single cycle (0x7e6) with a single register increment, it is statically evident that they both are striding loads. Thus, the cycles (0x765, 0x7bf) and (0x770, 0x7c5) do not have any irregular memory operations.

Hence, these cycles can be "run" (by prefetching the striding loads) multiple iterations ahead of the main computation, as long as the loop executes long enough. On the other hand, the non-trivial cycle in Trace 1 (0xee7, 0xeea) has one constant address load (0xee7) but the other load (0xeea) is irregular. So, it is not possible to "run" this cycle by just prefetching 0xee7. In fact, 0xeea is a "pointer-chasing" load, whose latency to memory cannot be reduced, short of shifting that whole computation closer to memory. From the reasoning above, the region in Trace 2 is "prefetchable" while that in Trace 1 is not.

As described above, the optimizer performs dataflow analysis of the region with the irregular loads. It generates the dataflow graph for the integer dataflow of the address computation and enumerates all the elementary cycles in the graph. If none of the elementary cycles has any irregular memory ops, the optimizer determines the region as prefetchable and generates a custom prefetcher for it.

Another advantageous aspect of disclosed embodiments derives from that fact that a popular pattern in irregular loads is indirection from striding loads, i.e., the value of a striding load is used as the address of an irregular load with an optional linear transformation ($K1*Address+K2$ where $K1$ and $K2$ are constants). This occurs in indirect programmatic access patterns such as A [B[i]] where B is a contiguous array of indices. The technique applied in disclosed embodiments will not only determine such scenarios as prefetchable and generate custom prefetchers for them, but also is applicable to more general situations where the transformation can be any arbitrary function (not necessarily linear, i.e., A [f(B[i]] where f is an arbitrary function). For instance, such access patterns are popular in hash tables where f is the hashing function of interest.

Optimizer Generates Custom Prefetchers

According to disclosed embodiments, the next step after the identification of prefetchable loads is to generate the custom prefetchers for them. In some embodiments, the software profiler applies a heuristic approach to define custom prefetchers, either as software or hardware, to prefetch a calculated number of iterations worth of instructions from the loop, wherein the calculation involves estimating how long it will take to execute the instructions in the loop, and then prefetching enough iterations of the loop to establish a "look ahead" and stay enough ahead of the code instructions so as to hide the latency encountered by cache misses.

Furthermore, in some embodiments the software profiler identifies one or more "critical loads" in the loop that are expected to require a relatively higher number of cycles to execute, and then generates custom prefetchers targeting those critical load(s). Critical loads may include those that experience frequent cache misses. Critical loads may include those that are coupled with complex arithmetic operations. In some embodiments, the custom prefetchers cause the processor to focus on the critical loads, if any. To focus on critical loads, the custom prefetchers may cause the processor to perform those critical loads before non-critical operations.

In some embodiments, apart from register moves, operations performed in the backslice and selected for inclusion in custom prefetchers are loads and arithmetic and/or logical operations, which, in the case of hardware prefetchers, are all implemented using a few dedicated address generation units and ALUs. The selected arithmetic and/or logical operations, if any, include one or more of addition, subtraction, increment, decrement, multiply, divide, AND, OR, XOR, negate, and shift. In some embodiments, the selected arithmetic operations, In some embodiments, the selected arithmetic operations include complex operations, such as square root. In some embodiments, the selected arithmetic operations include trigonometric operations.

FIG. 7A illustrates an exemplary application-specific custom software prefetcher, according to some embodiments. Illustrated is a custom software prefetcher generated for Trace 2 using the prefetch hint instruction 'prefetch0/.' The prefetch is implemented by inserting software prefetch snippet 700 right after the instruction at address 0x770 and stays two iterations ahead of the main loop. The disclosed embodiment assumes that % bn are the registers reserved for the BT's use and that the masking at instruction, "0x75e: and $0x1fff, % r13d," of Trace 2 does not cause a wrap-around. So, in some embodiments, a one-time check for the wrap-around condition is inserted before BT-generated code before entering the loop with the custom prefetcher. In some embodiments, for the rare situation when the wrap-around condition is true, a separate version of the loop without the custom prefetcher is used. Also, software prefetch snippet 700 does not have any intervening stores between successive iterations of the loop. If there were intervening stores, speculative loads and alias checking support of the BT engine would be employed.

In some embodiments, all the loads in the custom software prefetch snippet 700 are made into speculative loads to ensure there is no change to the memory ordering of the application.

FIG. 7B illustrates an exemplary application-specific custom hardware prefetcher that corresponds to the custom software prefetcher of FIG. 7A, according to some embodiments. Hardware prefetcher 720 is the hardware alternative of the prefetcher for Trace 2 and is implemented in custom hardware that is closely coupled with the CPU's striding load prefetchers (Strider 1 722 and Strider 2 724 in FIG. 7B). The inputs to the strider blocks are the striding load instructions (at addresses 0x765 and 0x770) for which the user wants to track the addresses. The 'Value' blocks 726 and 728 access the cache and the data translation lookaside buffer (DTLB), while the '+' operations 730 and 732, and the '&' operations 734 and 736 are addition and bitwise AND operations, respectively. The 'Address' block 738 is an address generation unit that computes the virtual address 742 based on the value 740 and the base-index-scale inputs. For the purposes of clarity, FIG. 7B shows the scenario where the prefetcher stays one iteration ahead of the main computation. However, this look-head can be increased by configuring the striders to correspondingly stay further ahead and by reusing the ALUs for multiple iterations of the look ahead. It is to be noted that this hardware in some embodiments is to be enabled on entry into the loop and disabled on exit from it.

Further Examples

Example 1 provides an exemplary processor including: a cache memory, fetch and decode circuitry to fetch and decode instructions from a memory, and execution circuitry including a binary translator (BT) to respond to the decoded instructions by storing a stream of decoded instructions in a BT cache, identifying a delinquent irregular load (DIRRL) among the stream, determining whether the DIRRL is prefetchable, and, if so, generating a custom prefetcher to cause the processor to prefetch a region of instructions leading up to the prefetchable DIRRL.

Example 2 includes the substance of the exemplary processor of Example 1, wherein the DIRRL is a delinquent load that experiences greater than a first threshold number of cache misses on successive dynamic instances.

Example 3 includes the substance of the exemplary processor of Example 2, wherein the DIRRL is an irregular load having at least a second threshold number of address deltas among its successive dynamic instances, and wherein the second threshold number of address deltas covers less than a third threshold number of successive dynamic instances.

Example 4 includes the substance of the exemplary processor of Example 3, wherein the execution circuitry is to compute a backslice between two successive dynamic instances of the DIRRL, and to determine that the DIRRL is prefetchable when the backslice includes cycles made entirely of non-memory operations or regular memory operations.

Example 5 includes the substance of the exemplary processor of Example 4, wherein the custom prefetcher is to cause the processor to prefetch a single, critical load among the backslice.

Example 6 includes the substance of the exemplary processor of Example 4, wherein the custom prefetcher is to cause the processor to prefetch a plurality of irregular loads, the plurality to contain fewer instructions than are contained in the backslice.

Example 7 includes the substance of the exemplary processor of Example 1, wherein the custom prefetcher includes one or more prefetch hints stored among the stream of instructions in the memory.

Example 8 includes the substance of the exemplary processor of Example 1, wherein the custom prefetcher includes a hardware prefetcher using the execution circuitry.

Example 9 includes the substance of the exemplary processor of Example 1, wherein the BT is separate from the execution circuitry.

Example 10 includes the substance of the exemplary processor of Example 1, wherein the BT is incorporated into the execution circuitry.

Example 11 provides an exemplary method performed by a processor including: fetching and decoding instructions from a memory using fetch and decode circuitry, responding to decoded instructions with execution circuitry using a binary translator to: store a stream of decoded instructions in a BT cache memory, track cache misses of load instructions to identify delinquent loads, profile address deltas of successive instances of the delinquent loads to identify a delinquent irregular load (DIRRL), determine, by analyzing a backslice between successive dynamic instances of the DIRRL, whether the DIRRL is prefetchable, and, if so, generate a custom prefetcher to cause the processor to prefetch a region of instructions leading up to the prefetchable DIRRL.

Example 12 includes the substance of the exemplary method of Example 11, wherein the DIRRL is a delinquent load whose successive instances experience greater than a first threshold number of cache misses.

Example 13 includes the substance of the exemplary method of Example 12, wherein the DIRRL is further an irregular load having at least a second threshold number of address deltas among its successive dynamic instances, and wherein the second threshold number of address deltas covers less than a third threshold number of successive dynamic instances.

Example 14 includes the substance of the exemplary method of Example 11, wherein the DIRRL is determined to be prefetchable when the backslice includes instructions including entirely of non-memory operations or regular memory operations.

Example 15 includes the substance of the exemplary method of Example 11, wherein the custom prefetcher includes one or more prefetch hints stored in the memory among the stream of instructions in memory.

Example 16 includes the substance of the exemplary method of Example 11, wherein the custom prefetcher includes a custom hardware prefetcher using the execution circuitry.

Example 17 includes the substance of the exemplary processor of Example 11, wherein the custom prefetcher is to cause the processor to prefetch a single, critical load among the backslice.

Example 18 includes the substance of the exemplary processor of Example 11, wherein the custom prefetcher is to cause the processor to prefetch a plurality of irregular loads, the plurality to contain fewer instructions than are contained in the backslice.

Example 19 includes the substance of the exemplary method of Example 11, wherein the BT is separate from the execution circuitry.

Example 20 includes the substance of the exemplary method of Example 11, wherein the BT is incorporated into the execution circuitry.

Example 21 provides an exemplary processor comprising: a cache memory, fetch and decode circuitry to fetch and decode instructions from a memory, and a binary translator (BT) to respond to the decoded instructions by: storing a plurality of the decoded instructions in a BT cache, identifying a delinquent irregular load (DIRRL) among the stored instructions, determining whether the DIRRL is prefetchable, and if so, generating a custom prefetcher to cause the processor to prefetch a region of instructions leading up to the prefetchable DIRRL.

Example 22 includes the substance of the exemplary processor of Example 21, wherein the DIRRL is a delinquent load that experiences greater than a first threshold number of cache misses on successive dynamic instances.

Example 23 includes the substance of the exemplary processor of Example 22, wherein the DIRRL is an irregular load having at least a second threshold number of address deltas among its successive dynamic instances, and wherein the second threshold number of address deltas covers less than a third threshold number of successive dynamic instances.

Example 24 includes the substance of the exemplary processor of Example 23, wherein the execution circuitry is to compute a backslice between two successive dynamic instances of the DIRRL, and to determine that the DIRRL is prefetchable when the backslice comprises cycles made entirely of non-memory operations or regular memory operations.

Example 25 includes the substance of the exemplary processor of Example 24, wherein the custom prefetcher is to cause the processor to prefetch one or more critical loads among the backslice.

Example 26 includes the substance of the exemplary processor of Example 24, wherein the custom prefetcher is to cause the processor to prefetch a plurality of irregular loads, the plurality to contain fewer instructions than are contained in the backslice.

Example 27 includes the substance of the exemplary processor of Example 21, wherein the custom prefetcher comprises one or more prefetch hints stored among the plurality of instructions in the memory.

Example 28 includes the substance of the exemplary processor of Example 21, wherein the custom prefetcher comprises a hardware prefetcher using the execution circuitry.

Example 29 includes the substance of the exemplary processor of Example 21, wherein the processor further includes execution circuitry, and wherein the BT is separate from the execution circuitry.

Example 30 includes the substance of the exemplary processor of Example 21, wherein the processor further includes execution circuitry, and wherein the BT is incorporated into the execution circuitry.

Example 31 provides an exemplary non-transitory computer-readable medium containing instructions that, when performed by a computing apparatus, cause the computing apparatus to respond by: fetching and decoding instructions from a memory using fetch and decode circuitry, and responding to decoded instructions using a binary translator (BT) to: store a plurality of decoded instructions in a BT cache memory, track cache misses of load instructions to identify delinquent loads, profile address deltas of successive instances of the delinquent loads to identify a delinquent irregular load (DIRRL), and determine, by analyzing a backslice between successive dynamic instances of the DIRRL, whether the DIRRL is prefetchable, and, if so, generate a custom prefetcher to cause the processor to prefetch a region of instructions leading up to the prefetchable DIRRL.

Example 32 includes the substance of the exemplary computer-readable medium of Example 31, wherein the DIRRL is a delinquent load whose successive instances experience greater than a first threshold number of cache misses.

Example 33 includes the substance of the exemplary computer-readable medium of Example 32, wherein the DIRRL has at least a second threshold number of address deltas among its successive dynamic instances, and wherein the second threshold number of address deltas covers less than a third threshold number of successive dynamic instances.

Example 34 includes the substance of the exemplary computer-readable medium of Example 31, wherein the DIRRL is determined to be prefetchable when the backslice comprises instructions comprising entirely of non-memory operations or regular memory operations.

Example 35 includes the substance of the exemplary computer-readable medium of Example 31, wherein the custom prefetcher comprises one or more prefetch hints stored in the memory among the plurality of instructions in memory.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
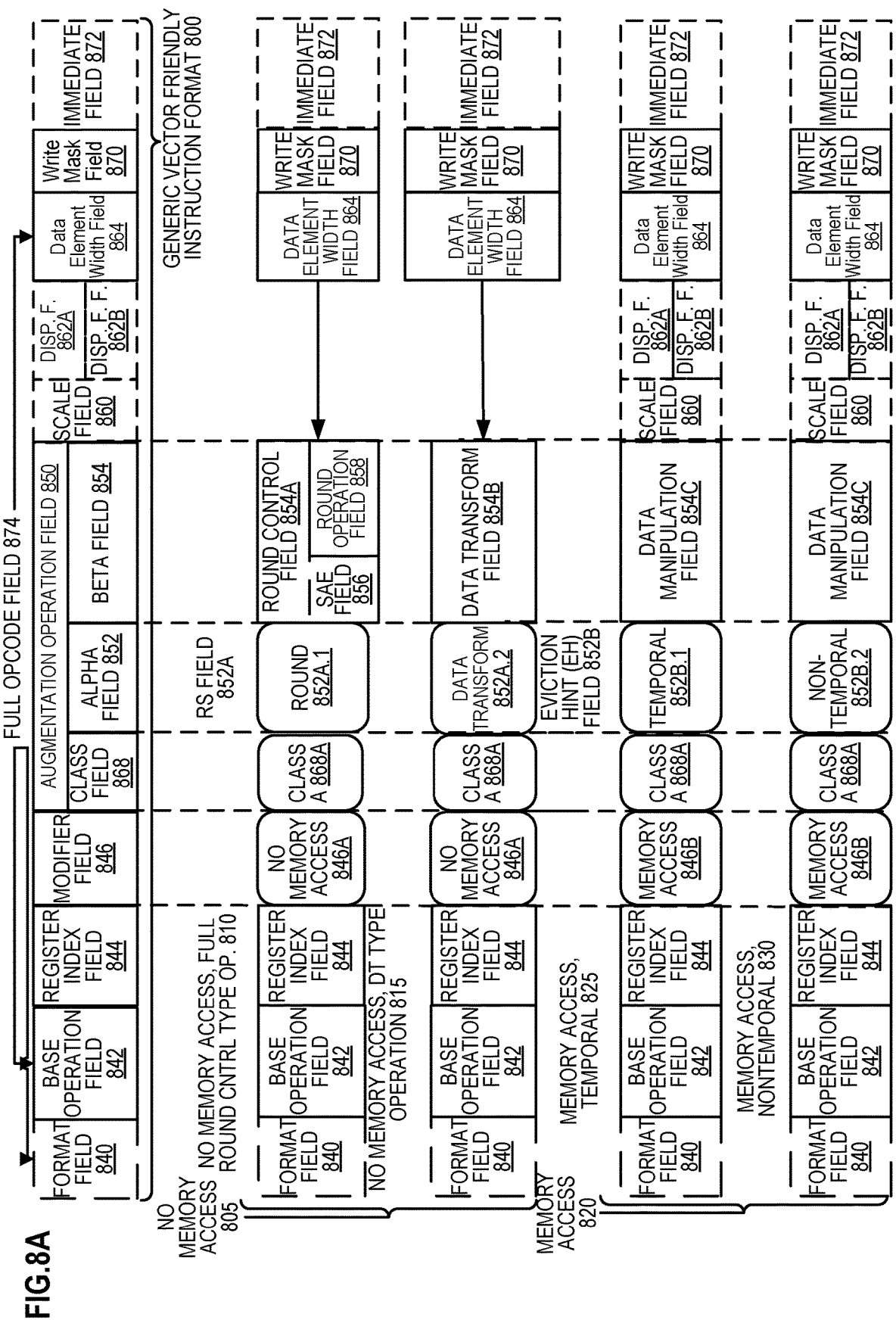
FIGS. 8A-8B are block diagrams illustrating a generic vector friendly instruction format and instruction templates thereof according to some embodiments of the invention.
Figure 8B:
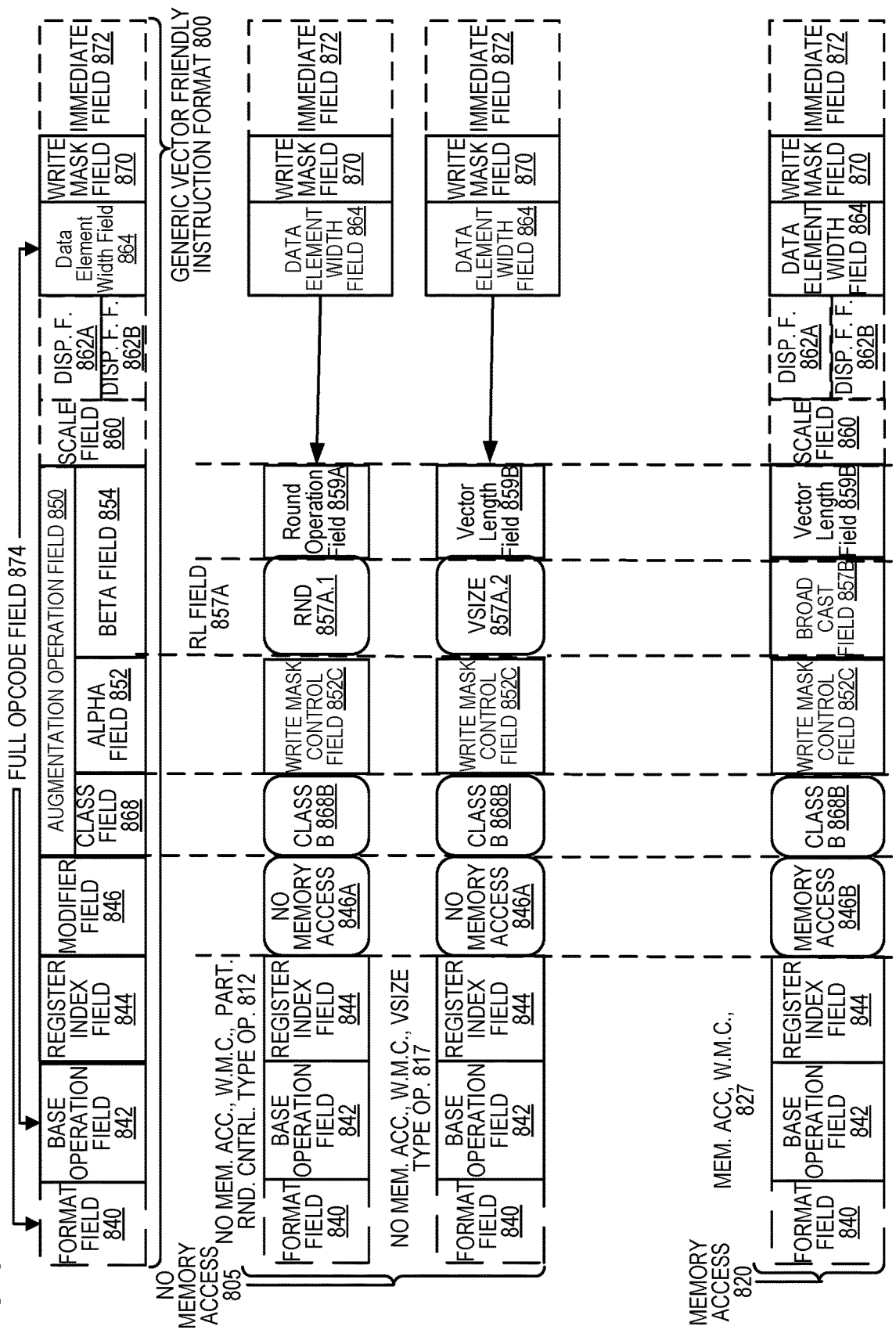

FIGS. 8A-8B are block diagrams illustrating a generic vector friendly instruction format and instruction templates thereof according to some embodiments of the invention. FIG. 8A is a block diagram illustrating a generic vector friendly instruction format and class A instruction templates thereof according to some embodiments of the invention; while FIG. 8B is a block diagram illustrating the generic vector friendly instruction format and class B instruction templates thereof according to some embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operands and sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In some embodiments, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}*$index+base).

Displacement Field 862A—its content is used as part of memory address generation (e.g., for address generation that uses $2^{scale}*$index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the invention the round control field 854A includes a suppress all floating-point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating-point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In some embodiments where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating-point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In some embodiments where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9A is a block diagram illustrating an exemplary specific vector friendly instruction format according to some embodiments of the invention. FIG. 9A shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIG. 8 into which the fields from FIG. 9A map are illustrated.

It should be understood that, although embodiments of the invention are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in some embodiments).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 910A—this is the first part of the REX' field 910 and is the EVEX.R' bit field (EVEX Byte 1, bit [4]—R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (0F, 0F 38, or 0F 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.0 868 Class field (EVEX byte 2, bit [2]—U)—If EVEX.0=0, it indicates class A or EVEX.U0; if EVEX.0=1, it indicates class B or EVEX.U1.

Prefix encoding field 925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 910B—this is the remainder of the REX' field 910 and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand or be treated as an opcode extension and not used to encode any instruction operand. The role of R/M field 946 may include the following: encoding the instruction operand that references a memory address or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to some embodiments. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to some embodiments. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
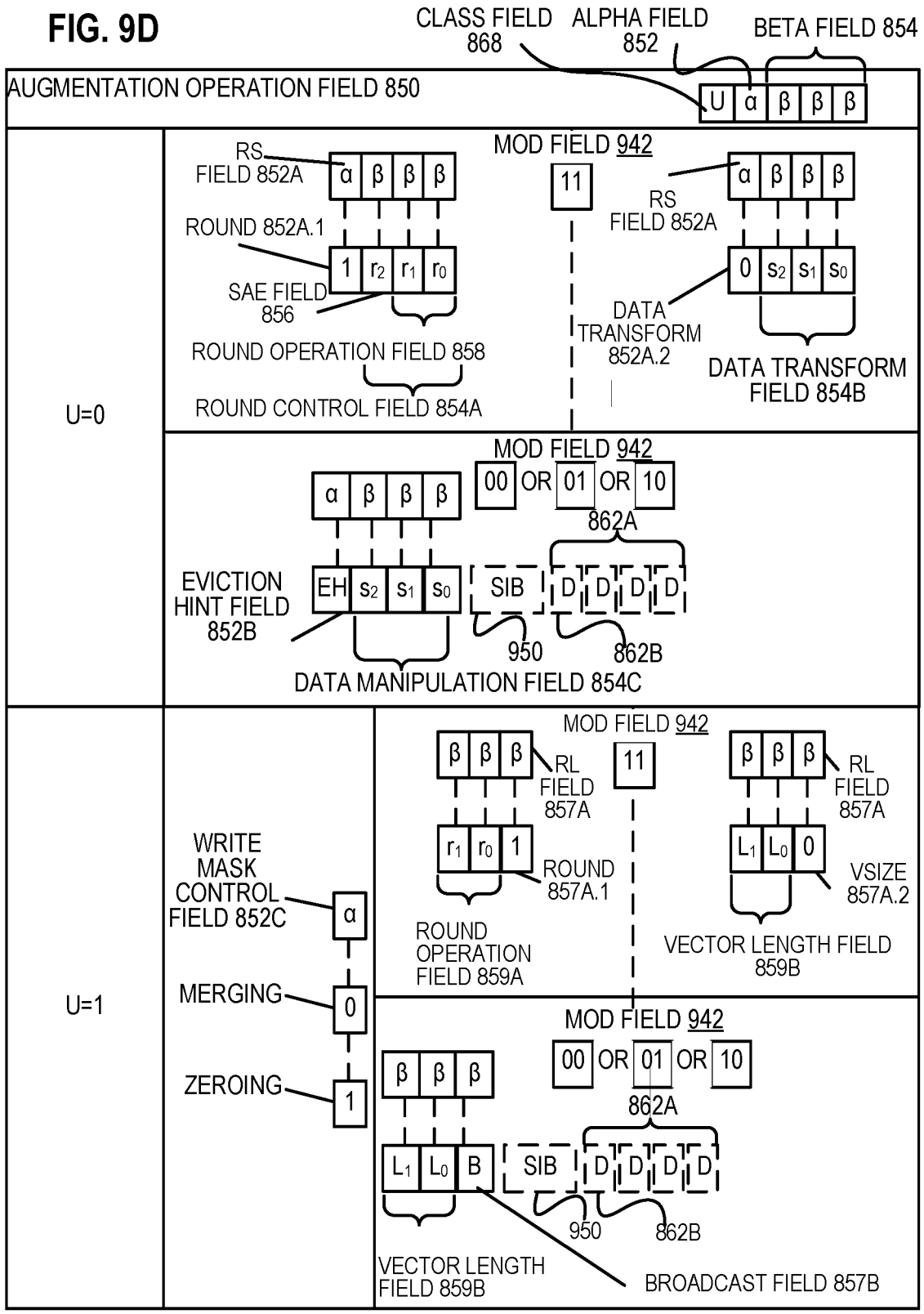
FIG. 9D is a block diagram illustrating the fields of the specific vector friendly instruction format that make up the augmentation operation field according to one embodiment.

FIG. 9D is a block diagram illustrating the fields of the specific vector friendly instruction format 900 that make up the augmentation operation field 850 according to some embodiments. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—$S_0$) is interpreted as the RL field 857A; when it contains a 1 (round 857A.1) the rest of the beta field 854 (EVEX byte 3, bit [6-5]—$S_{2-1}$) is interpreted as the round operation field 859A, while when the RL field 857A contains a 0 (VSIZE 857.A2) the rest of the beta field 854 (EVEX byte 3, bit [6-5]—$S_{2-1}$) is interpreted as the vector length field 859B (EVEX byte 3, bit [6-5]—$L_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—$L_{1-0}$) and the broadcast field 857B (EVEX byte 3, bit [4]—B).

Exemplary Register Architecture

Figure 10:
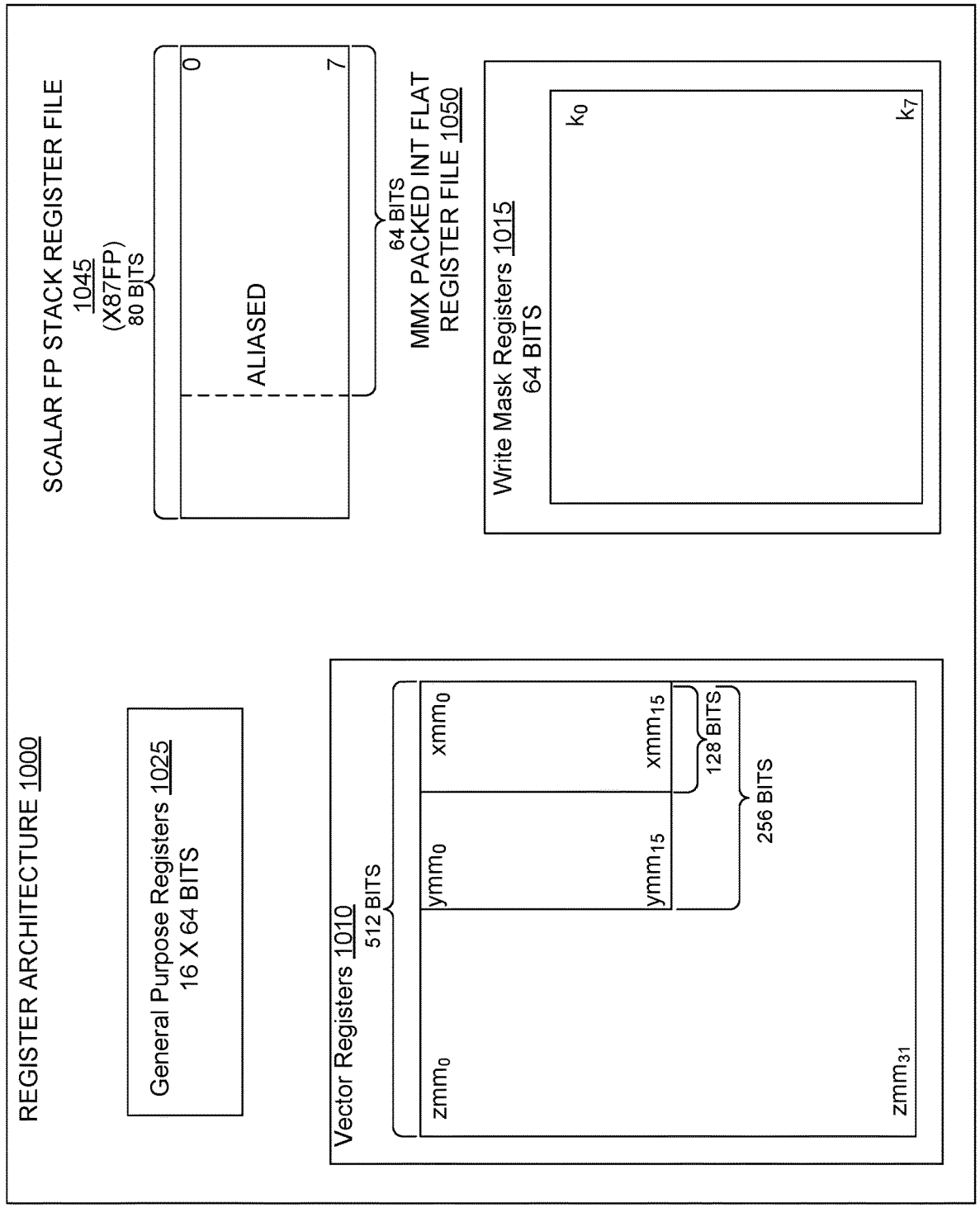
FIG. 10 is a block diagram of a register architecture according to one embodiment.

FIG. 10 is a block diagram of a register architecture 1000 according to some embodiments. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |

| Adjustable Vector Length | Class | Operations | Registers |
|---|---|---|---|
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating-point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 1045, on which is aliased the MMX packed integer flat register file 1050—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to some embodiments of the invention. FIG. 11B is a block diagram illustrating both an exemplary embodiment of an in-order architecture core and an exemplary register renaming, out-of-order issue/execution architecture core to be included in a processor according to some embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 12B:
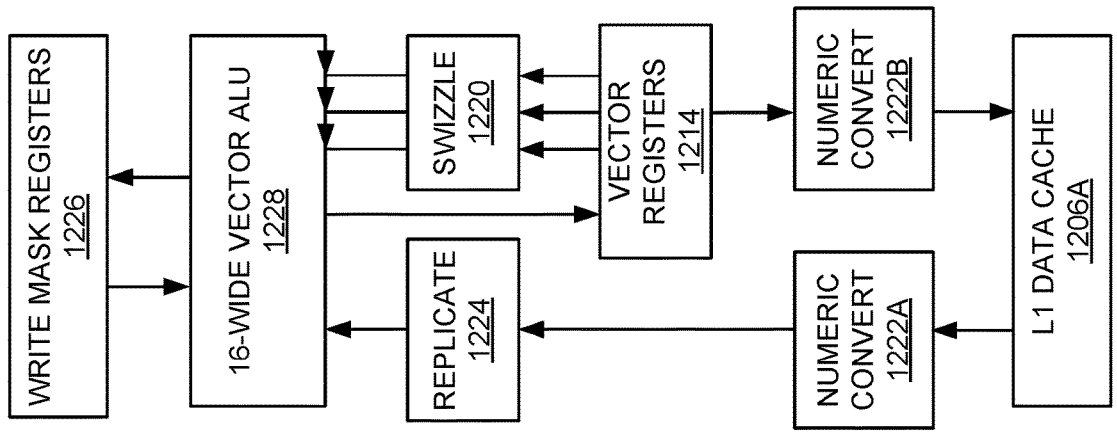
FIGS. 12A-B illustrate a block diagram of a more specific exemplary in-order core architecture, which core would be one of several logic blocks (including other cores of the same type and/or different types) in a chip.
Figure 12A:
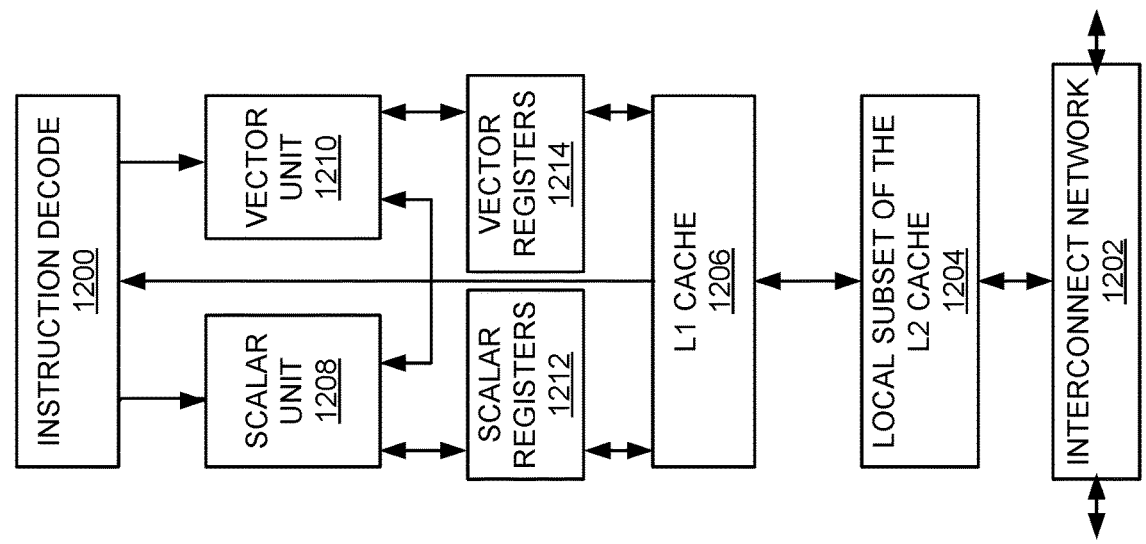

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache

1204, according to some embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to some embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
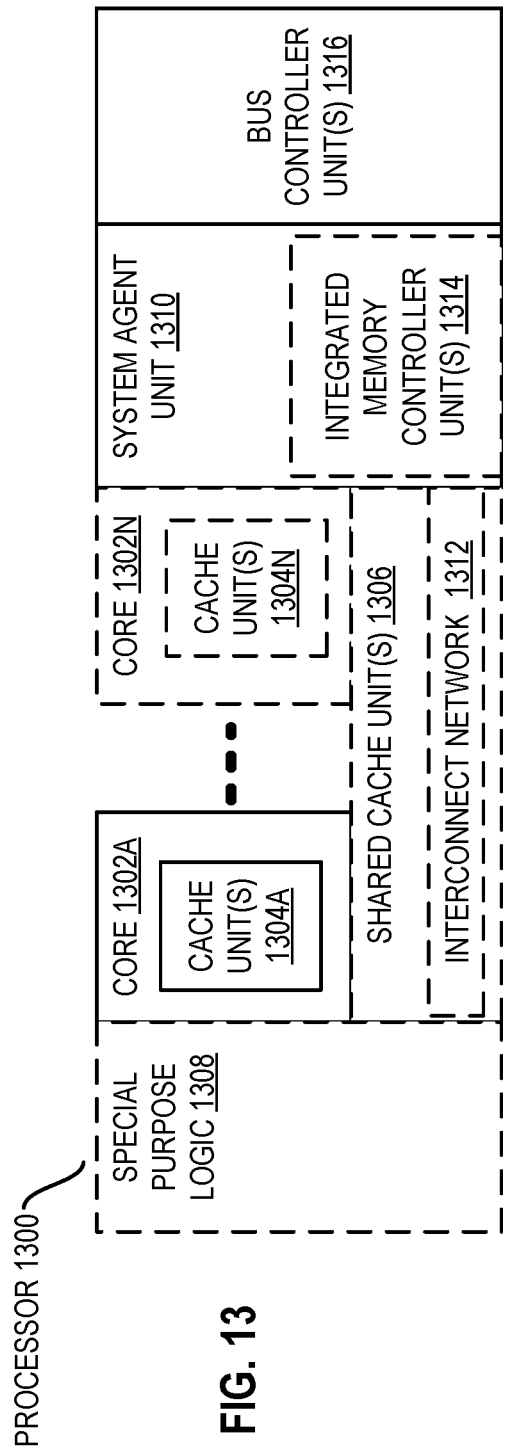
FIG. 13 is a block diagram of a processor that may have more than one core, may have an integrated memory controller, and may have integrated graphics according to some embodiments.

FIG. 13 is a block diagram of a processor 1300 that may have more than one core, may have an integrated memory controller, and may have integrated graphics according to some embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308 (integrated graphics logic 1308 is an example of and is also referred to herein as special purpose logic), the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
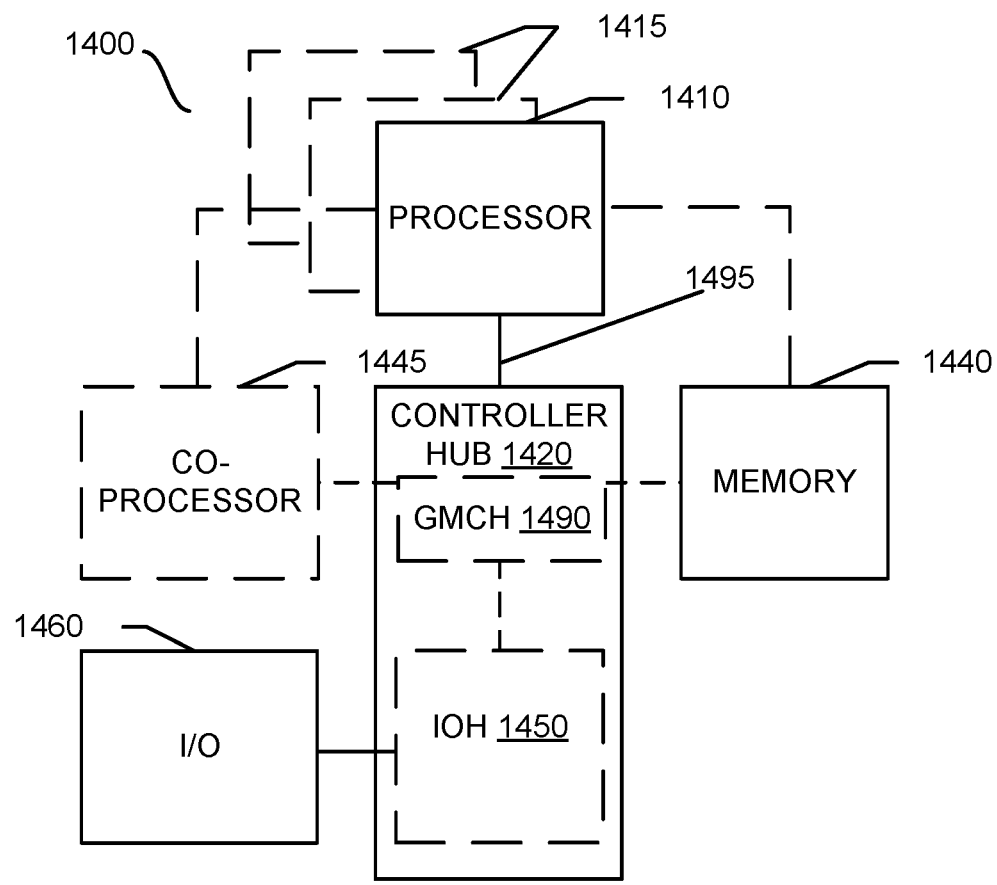
FIGS. 14-17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
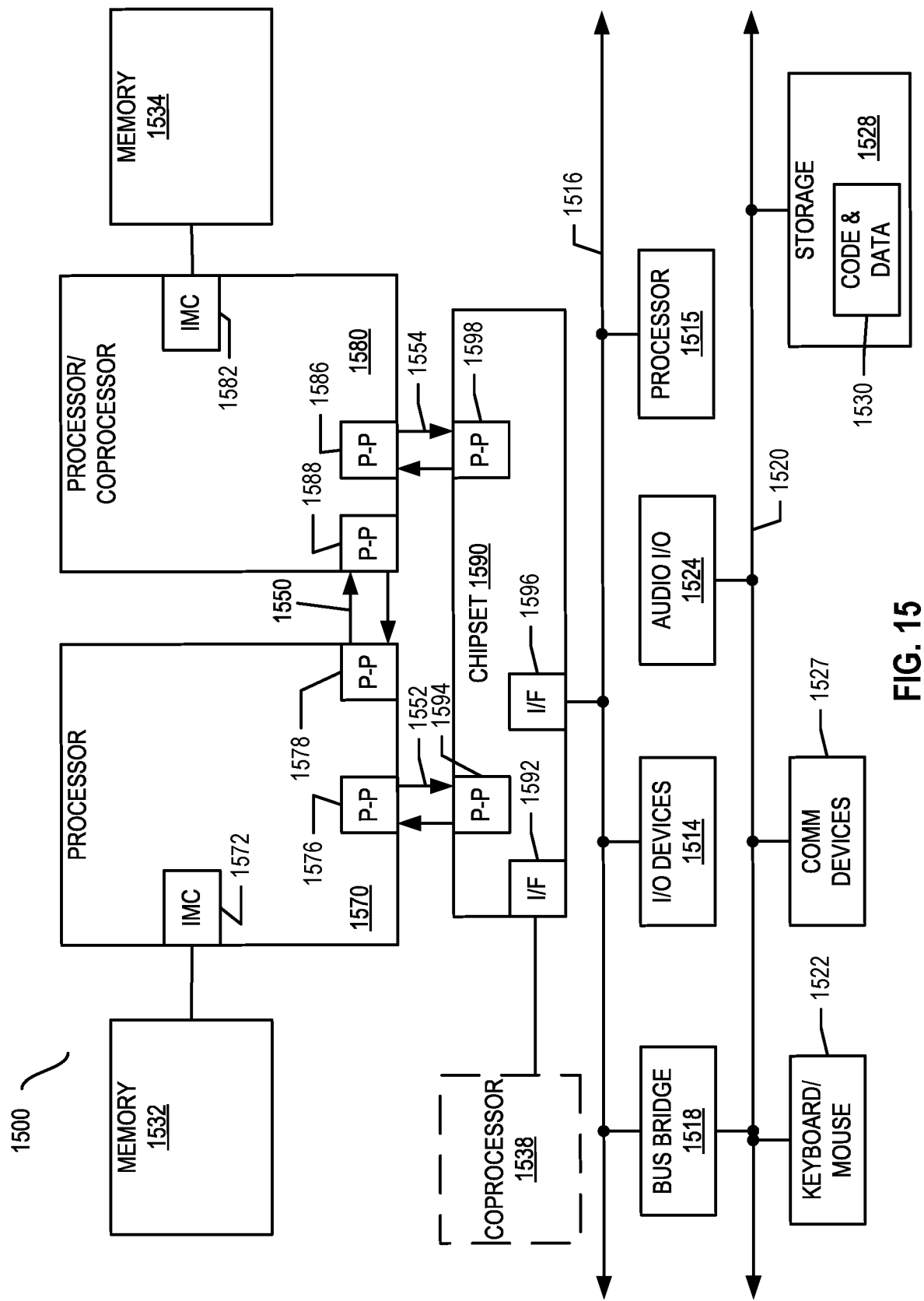

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In some embodiments, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
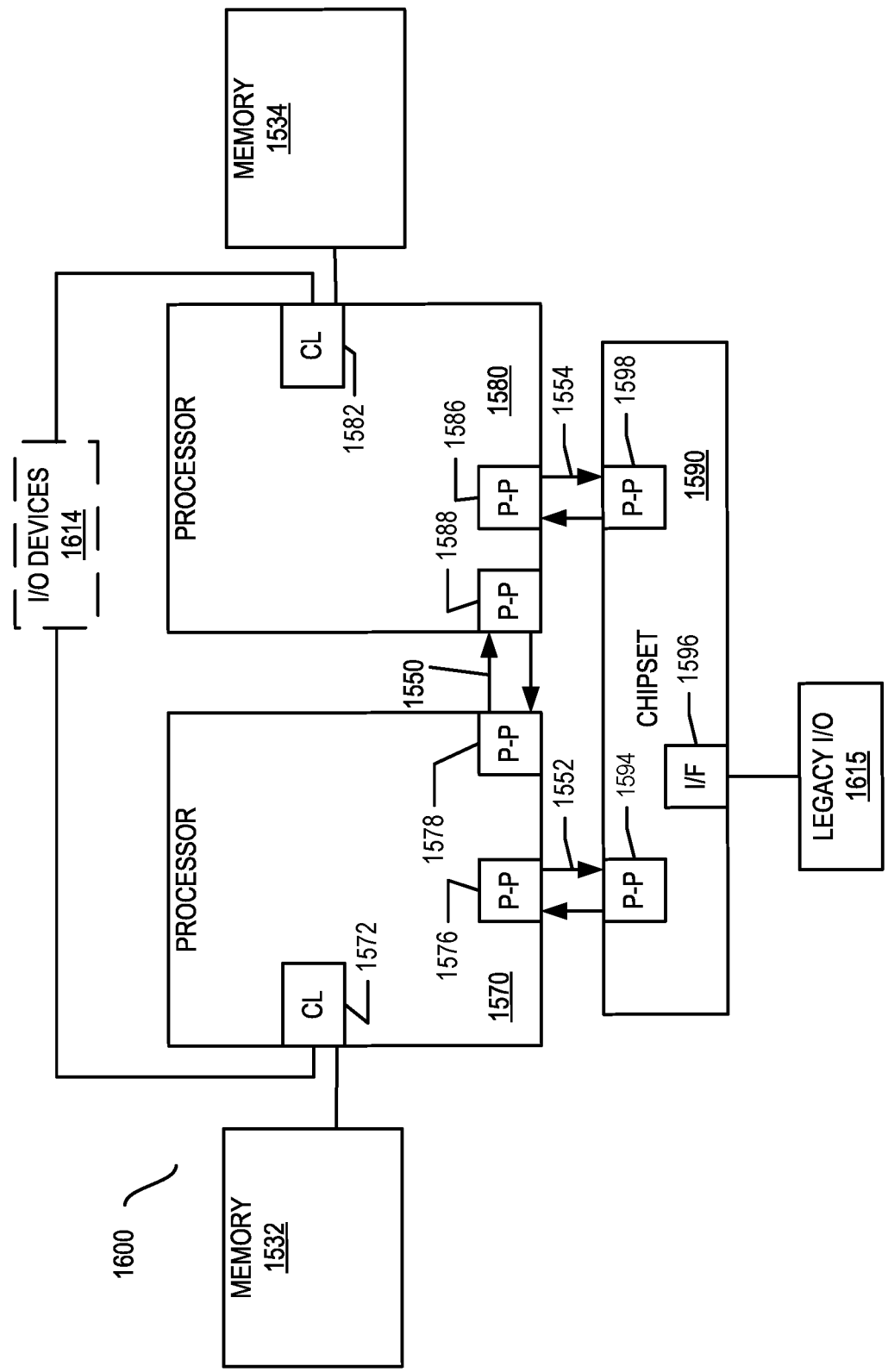

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
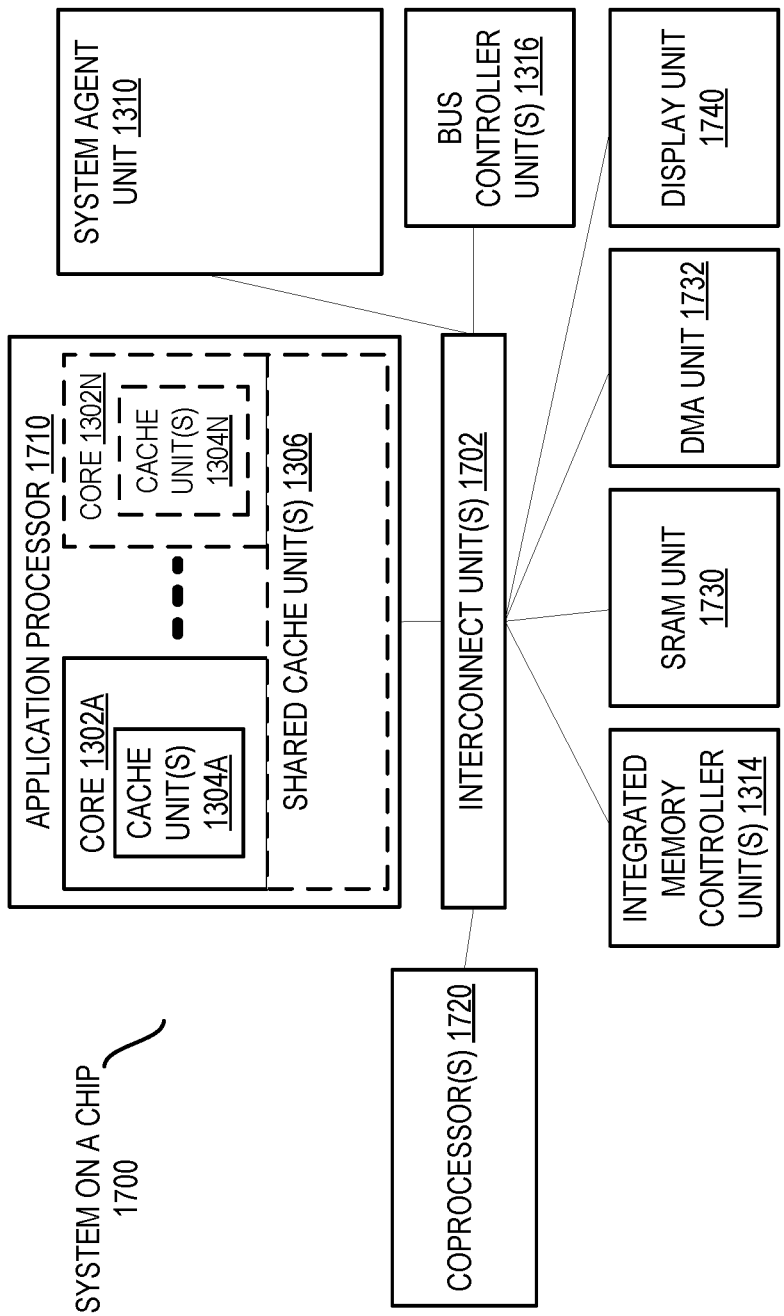

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N, which include cache units 1304A-N, and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

What is claimed is:

1. A method to be performed by a processor, the processor comprising:
 a cache memory;
 fetch and decode circuitry to fetch and decode instructions from a memory; and
 execution circuitry comprising a binary translator (BT) to respond to the decoded instructions by:
  storing a plurality of the decoded instructions in a BT cache;
  identifying a delinquent irregular load (DIRRL) among the stored instructions;
  determining whether the DIRRL is prefetchable; and if so, generating a custom prefetcher to cause the processor to prefetch a region of instructions leading up to the prefetchable DIRRL.

2. The method of claim 1, wherein the DIRRL is a delinquent load that experiences greater than a first threshold number of cache misses on successive dynamic instances.

3. The method of claim 2, wherein the DIRRL is an irregular load having at least a second threshold number of address deltas among its successive dynamic instances, and wherein the second threshold number of address deltas covers less than a third threshold number of successive dynamic instances.

4. The method of claim 3, wherein the execution circuitry is to compute a backslice between two successive dynamic instances of the DIRRL, and to determine that the DIRRL is prefetchable when the backslice comprises cycles made entirely of non-memory operations or regular memory operations.

5. The method of claim 4, wherein the custom prefetcher is to cause the processor to focus on one or more critical loads among the backslice by only enqueueing the one or more critical loads and no others.

6. The method of claim 4, wherein the custom prefetcher is to cause the processor to prefetch a plurality of irregular loads, the plurality to contain fewer instructions than are contained in the backslice.

7. The method of claim 1, wherein the custom prefetcher comprises one or more prefetch hints stored among the plurality of instructions in the memory.

8. The method of claim 1, wherein the custom prefetcher comprises a hardware prefetcher using the execution circuitry.

9. The method of claim 1, wherein the custom prefetcher comprises one or more prefetch hint instructions to be executed using an existing instruction execution pipeline of the processor.

10. The method of claim 1, wherein the custom prefetcher comprises a hardware prefetchers to use an existing execution cluster of the processor.

11. A processor comprising:
a cache memory;
fetch and decode circuitry to fetch and decode instructions from a memory; and
a binary translator (BT) to respond to the decoded instructions by:
storing a plurality of the decoded instructions in a BT cache;
identifying a delinquent irregular load (DIRRL) among the stored instructions;
determining whether the DIRRL is prefetchable; and
if so, generating a custom prefetcher to cause the processor to prefetch a region of instructions leading up to the prefetchable DIRRL.

12. The processor of claim 11, wherein the DIRRL is a delinquent load that experiences greater than a first threshold number of cache misses on successive dynamic instances.

13. The processor of claim 12, wherein the DIRRL is an irregular load having at least a second threshold number of address deltas among its successive dynamic instances, and wherein the second threshold number of address deltas covers less than a third threshold number of successive dynamic instances.

14. The processor of claim 13, wherein the execution circuitry is to compute a backslice between two successive dynamic instances of the DIRRL, and to determine that the DIRRL is prefetchable when the backslice comprises cycles made entirely of non-memory operations or regular memory operations.

15. The processor of claim 14, wherein the custom prefetcher is to cause the processor, when performing the prefetching, to perform one or more critical loads among the backslice before performing non-critical loads.

16. The processor of claim 14, wherein the custom prefetcher is to cause the processor to prefetch a plurality of irregular loads, the plurality to contain fewer instructions than are contained in the backslice.

17. The processor of claim 11, wherein the custom prefetcher comprises one or more prefetch hints stored among the plurality of instructions in the memory.

18. The processor of claim 11, wherein the custom prefetcher comprises a hardware prefetcher using the execution circuitry.

19. The processor of claim 11, wherein the processor further includes execution circuitry, and wherein the BT is separate from the execution circuitry.

20. The processor of claim 11, wherein the processor further includes execution circuitry, and wherein the BT is incorporated into the execution circuitry.

21. A non-transitory computer-readable medium containing instructions that, when performed by a computing apparatus, cause the computing apparatus to respond by:
fetching and decoding instructions from a memory using fetch and decode circuitry; and
responding to decoded instructions using a binary translator (BT) to:
store a plurality of decoded instructions in a BT cache memory;
track cache misses of load instructions to identify delinquent loads;
profile address deltas of successive instances of the delinquent loads to identify a delinquent irregular load (DIRRL); and
determine, by analyzing a backslice between successive dynamic instances of the DIRRL, whether the DIRRL is prefetchable, and, if so, generate a custom prefetcher to cause the processor to prefetch a region of instructions leading up to the prefetchable DIRRL.

22. The computer-readable medium of claim 21, wherein the DIRRL is a delinquent load whose successive instances experience greater than a first threshold number of cache misses.

23. The computer-readable medium of claim 22, wherein the DIRRL has at least a second threshold number of address deltas among its successive dynamic instances, and wherein the second threshold number of address deltas covers less than a third threshold number of successive dynamic instances.

24. The computer-readable medium of claim 21, wherein the DIRRL is determined to be prefetchable when the backslice comprises instructions comprising entirely of non-memory operations or regular memory operations.

25. The computer-readable medium of claim 21, wherein the custom prefetcher comprises one or more prefetch hints stored in the memory among the plurality of instructions in memory.

* * * * *